United States Patent
Dougherty et al.

(10) Patent No.: US 10,838,415 B2
(45) Date of Patent: Nov. 17, 2020

(54) SYSTEMS AND METHODS FOR AUTOMATICALLY CUSTOMIZING OPERATION OF A ROBOTIC VEHICLE

(71) Applicant: QUALCOMM Incorporated, San Diego, CA (US)

(72) Inventors: John Anthony Dougherty, Philadelphia, PA (US); Rizwan Ahmed, Haddonfield, NJ (US); Stephen Marc Chaves, Philadelphia, PA (US); Aleksandr Kushleyev, Philadelphia, PA (US); Paul Daniel Martin, Philadelphia, PA (US); Daniel Warren Mellinger, III, Philadelphia, PA (US); Michael Joshua Shomin, Philadelphia, PA (US); Michael Franco Taveira, San Diego, CA (US); Matthew Hyatt Turpin, Philadelphia, PA (US); Travis Van Schoyck, Lafayette Hill, PA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 15/693,966

(22) Filed: Sep. 1, 2017

(65) Prior Publication Data

US 2019/0072984 A1 Mar. 7, 2019

(51) Int. Cl.
*G05D 1/10* (2006.01)
*G05D 1/00* (2006.01)
(Continued)

(52) U.S. Cl.
CPC ........... *G05D 1/0022* (2013.01); *G06F 21/00* (2013.01); *G06F 21/316* (2013.01)

(58) Field of Classification Search
CPC .. G05D 1/0022; G05D 1/0016; B64C 39/024; B64C 2201/146; G06F 21/00; G06F 21/316; G06F 3/0488
(Continued)

(56) References Cited

U.S. PATENT DOCUMENTS 9,971,348 B1 * 5/2018 Canavor ............ G01C 21/3617
10,049,505 B1 * 8/2018 Harvey .................. G07C 5/008
(Continued)

FOREIGN PATENT DOCUMENTS

JP          2017500650 A     1/2017
WO        2009142628 A1    11/2009

OTHER PUBLICATIONS

International Search Report and Written Opinion—PCT/US2018/044491—ISA/EPO—dated Nov. 2, 2018, 19 pages.

*Primary Examiner* — Tuan C To
(74) *Attorney, Agent, or Firm* — Holland & Hart LLP

(57) ABSTRACT

Some embodiments include methods for customizing operation of the robotic vehicle for an operator. Such embodiments may include identifying a current operator of the robotic vehicle, configuring the robotic vehicle based on metadata associated with an operator profile for the operator, determining whether the operator has changed, and if so, identifying the new operator, deriving updated preference-based settings and performance-based settings for the new operator, and updating configurations of the robotic vehicle accordingly. Some embodiments may include identifying a current operator, retrieving an operator profile and associated metadata for the operator from a central database, configuring the robotic vehicle based on preference-based and performance-based settings, analyzing input data during operation, storing identified real-time operator habit information during operation of the robotic vehicle, deriving updated preference-based and performance-based settings (Continued)

for the operator; and uploading to the central database modifications to the metadata associated with the operator profile of the operator.

24 Claims, 10 Drawing Sheets

(51) Int. Cl.
    *B64C 39/02*     (2006.01)
    *G06F 21/31*     (2013.01)
    *G06F 21/00*     (2013.01)

(58) Field of Classification Search
    USPC .............................................................. 701/2
    See application file for complete search history.

(56) References Cited

U.S. PATENT DOCUMENTS

| | | | | |
|---|---|---|---|---|
| 2002/0161501 | A1* | 10/2002 | Dulin | B60H 1/00814 |
| | | | | 701/45 |
| 2003/0097047 | A1* | 5/2003 | Woltermann | A61B 5/165 |
| | | | | 600/300 |
| 2010/0201505 | A1* | 8/2010 | Honary | G08G 1/207 |
| | | | | 340/425.5 |
| 2013/0238170 | A1* | 9/2013 | Klinger | G05D 1/104 |
| | | | | 701/3 |
| 2014/0172290 | A1* | 6/2014 | Prokhorov | G01C 21/28 |
| | | | | 701/408 |
| 2014/0200737 | A1* | 7/2014 | Lortz | B60R 16/037 |
| | | | | 701/1 |
| 2015/0346724 | A1* | 12/2015 | Jones | B60W 30/12 |
| | | | | 701/23 |
| 2015/0348112 | A1* | 12/2015 | Ramanujam | G06Q 30/0266 |
| | | | | 705/14.63 |
| 2016/0068267 | A1 | 3/2016 | Liu et al. | |
| 2016/0085565 | A1* | 3/2016 | Arcese | G06F 21/32 |
| | | | | 726/7 |
| 2016/0086397 | A1* | 3/2016 | Phillips | G07C 5/0808 |
| | | | | 701/32.4 |
| 2016/0093124 | A1 | 3/2016 | Shi et al. | |
| 2016/0274578 | A1 | 9/2016 | Arwine et al. | |
| 2016/0288796 | A1* | 10/2016 | Yuan | B60K 35/00 |
| 2016/0307447 | A1 | 10/2016 | Johnson et al. | |
| 2017/0015405 | A1 | 1/2017 | Chau et al. | |
| 2017/0255966 | A1* | 9/2017 | Khoury | H04L 67/20 |
| 2017/0297586 | A1* | 10/2017 | Li | B60W 50/0098 |
| 2018/0093676 | A1* | 4/2018 | Emura | G01C 21/3617 |
| 2018/0219759 | A1* | 8/2018 | Brown | H04L 67/26 |
| 2019/0056731 | A1* | 2/2019 | Westbrook | G05D 1/0055 |

\* cited by examiner

SYSTEMS AND METHODS FOR AUTOMATICALLY CUSTOMIZING OPERATION OF A ROBOTIC VEHICLE

BACKGROUND

Aerial vehicles such as robotic vehicles may be used for performing surveillance, reconnaissance, and exploration tasks for military and civilian applications. Such vehicles may carry a payload configured to perform a variety of different activities desired by operators, such as capturing aerial images/video, participating in remote control racing, etc. Despite the many different capabilities, each individual operator typically uses a robotic vehicle primarily for a limited number of activities or applications, each of which can have different performance settings and operational characteristics. Further, conventional robotic vehicles may be manually controlled by an operator via a control device, or may operate in a flight mode with varying degrees of autonomy.

While an operator may perform a manual setup or mode selection to configure features such as functionality, flight control, and performance settings, the robotic vehicle is typically configured with default or standard capabilities and settings each time the robotic vehicle is activated. Further, the robotic vehicle may be configured to implement defaults for features if not specifically set by the operator that could be poorly suited for the operator's planned activity or application using the robotic vehicle.

SUMMARY

Various embodiments include methods performed by a processor of a robotic vehicle for customizing operation of the robotic vehicle for a current operator. Various embodiments may include identifying a current operator of the robotic vehicle, configuring the robotic vehicle based on metadata associated with an operator profile for the current operator, determining whether the current operator has changed, and in response to determining that the current operator has changed, identifying a new operator as the current operator of the robotic vehicle, deriving preference-based settings and performance-based settings for the new operator, and updating configurations of the robotic vehicle for the new operator. In some embodiments, the metadata may include operator habit information that includes an operator skill level.

In some embodiments, determining whether the current operator has changed may include determining whether an operator input deviates from the operator habit information for the current operator by more than a threshold amount.

In some embodiments, determining whether the current operator has changed may include determining whether real-time operator skill level deviates from the operator skill level of the current operator by more than a threshold amount.

Some embodiments may further include determining whether a real-time operator skill level deviates from the operator skill level of the current operator by an amount that is more than a first threshold and less than a second threshold, and updating the operator skill level of the current operator in response to determining that the real-time operator skill level deviates from the operator skill level of the current operator by an amount that is greater than the first threshold and less than the second threshold.

In some embodiments, determining whether the current operator has changed may include determining whether the real-time operator skill level deviates from the operator skill level of the current operator by an amount that is greater than the second threshold.

In some embodiments, identifying the current operator of the robotic vehicle may include receiving, from a control device associated with the robotic vehicle, identification information input by the current operator, determining whether the received identification information matches an identifier within an existing operator profile, and accessing the existing operator profile in response to determining that the received identification information matches an identifier within the existing operator profile.

In some embodiments, the received identification information may include biometric data for the current operator, a log-in credential, or a combination thereof. Some embodiments may further include creating a new operator profile in response to determining that the received identification information does not match an identifier within an existing operator profile.

Some embodiments may further include collecting and analyzing input data during operation of the robotic vehicle, updating the operator habit information based at least in part on the input data, deriving updated preference-based settings and performance-based settings based at least in part on the updated operator habit information, and modifying the metadata associated with the operator profile based on the updated operator habit information and updated preference-based and performance-based settings. In some embodiments, the input data may include control commands and sensor data. In some embodiments, the updated operator habit information may include a real-time operator skill level.

In some embodiments, the operator habit information may include operation preferences, which may include at least one application or activity for which an operator employs the robotic vehicle. In some embodiments, the metadata associated with the operator profile for the current operator may include preference-based and performance-based settings. In some embodiments, preference-based and performance-based settings may be derived at least in part based on the operator habit information.

In some embodiments, preference-based settings may include one or more of a preferred flight mode, an operator assist strategy, and a set of enabled features on the robotic vehicle. In some embodiments, the performance-based settings may include one or more scalable parameters configured to adjust an operation style based on the operator skill level.

Various embodiments may include identifying a current operator, retrieving an operator profile and associated metadata for the current operator from a central database, configuring the robotic vehicle based on existing preference-based and performance-based settings, collecting and analyzing input data during operation of the robotic vehicle, storing identified real-time operator habit information during operation of the robotic vehicle, deriving updated preference-based and performance-based settings for the current operator, and uploading to the central database modifications to the metadata associated with the operator profile of the current operator. In some embodiments, the metadata may include operator habit information. In some embodiments, the existing preference-based and performance-based settings may be based on the metadata. In some embodiments, the input data may include control commands and sensor data.

Some embodiments may further include reconfiguring the robotic vehicle based on the updated preference-based and performance-based settings. In some embodiments, preference-based and performance-based settings may be included in the retrieved metadata. In some embodiments, the existing preference-based and performance-based settings may be derived on the robotic vehicle from the operator habit information included in the metadata. In some embodiments, deriving the updated preference-based and performance-based settings for the current operator may include deriving the updated preference-based and performance-based settings for the current operator based at least in part on the identified real-time operator habit information and the existing preference-based and performance-based settings.

Further embodiments may include a robotic vehicle including a processing device configured to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
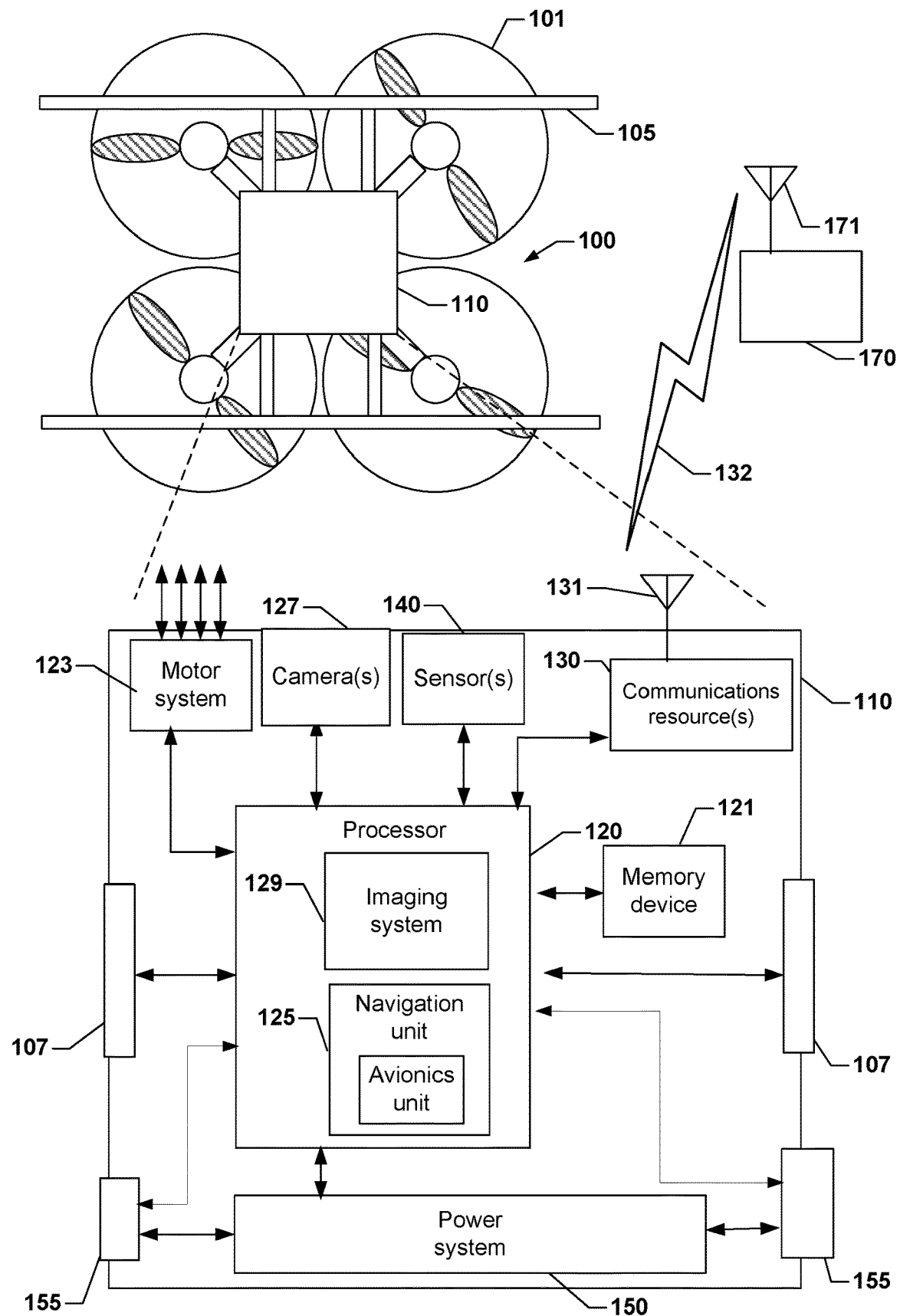
FIG. 1 is a block diagram illustrating components of a typical robotic vehicle system suitable for use in the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods performed by a processor of a robotic vehicle for customizing operations and control parameters of the robotic vehicle to preferences and operating styles of particular operators. Various embodiments may include configuring robotic vehicles for particular operators based upon information in an operator profile that may be stored in a database. The processor of the robotic vehicle may be configured to identify or recognize the operator controlling the robotic vehicle by observing or analyzing operator inputs, control commands, sensor data, and/or the like, and then comparing such inputs to characteristics in operator profiles within a database of operator profiles to identify operator input characteristics matching observed operator inputs. Comparing observed operator inputs to operator characteristics may be used to recognize changes in the operator, and the robotic vehicle may be reconfigured dynamically accordingly. While the robotic vehicle is controlled by an operator, the processor may update the operator habit and characteristic data in the operator's operator profile within the database.

As used herein, the terms "robotic vehicle" and "drone" refer to one of various types of vehicles including an onboard computing device configured to provide some autonomous or semi-autonomous capabilities. Examples of robotic vehicles include but are not limited to: aerial vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors.

Various embodiments improve robotic device operations by learning operator-specific preferences and performance characteristics, and automatically configuring the robotic device based on the learned information. Automatically configuring robotic vehicles allows a single robotic vehicle and control device to be shared between multiple operators without losing the ability to provide customized flight parameters for the current operator. Further, various embodiments enable operator-specific preference and performance information to be stored in a central database accessible to various robotic vehicles. Such central database allows customized flight parameters to be applied to any robotic vehicle of the same or similar model that may be operated by a given operator. Using these techniques, an extensive level of customization is enabled for robotic vehicle operation, which provides improved efficiency in battery use and allows for better estimation of expected flight patterns.

A typical commercial robotic vehicle may be configured to perform a number of different activities or applications, each of which can be associated with different settings and characteristics. For example, a module or set of modules that provides additional functionality by running on the controller, such as a module for visual inertial odometry, for collision avoidance, etc. Such modules can consume significant processing power, however, and therefore unnecessarily drain battery life when not required by the operator's desired robotic vehicle activity. Also, depending on a given mission or desired operational activity, the robotic vehicle may be set to implement different flight control techniques, such as operator-assist strategies (e.g., high degree of manual control for remote control racing, high degree of autonomous capability for capturing aerial images/video, etc.). Further, the robotic vehicle settings may include performance characteristics that are scalable to an operator's level of experience, such as techniques for handing control command input. For example, robotic vehicle settings and performance characteristics may include scaling input commands, scaling how aggressively to track operator input, speed limits, acceleration limits, etc.

Various embodiments may be useful with any of a number of robotic vehicles, examples of which include UAVs, unmanned autonomous land vehicles, unmanned autonomous watercraft, and autonomous spacecraft. Various embodiments may be particularly useful for aerial robotic vehicles due to their high mobility, and increasing applications and numbers of aerial robotic vehicles, as well as the presence of restricted airspace throughout the world.

An example robotic vehicle 100 illustrated in FIG. 1 is a "quad copter" having four horizontally configured rotary lift propellers 101 and motors fixed to a frame 105. The frame 105 may support a controller 110, landing skids and the propulsion motors, power source (power unit 150) (e.g., battery), payload securing mechanism (payload securing unit 107), and other components.

The robotic vehicle 100 may be provided with a control unit 110. The control unit 110 may include a processor 120, communication resource(s) 130, sensor(s) 140, and a power unit 150. The processor 120 may be coupled to a memory unit 121 and a navigation unit 125. The processor 120 may be configured with processor-executable instructions to control flight and other operations of the robotic vehicle 100, including operations of the various embodiments. In some embodiments, the processor 120 may be coupled to a payload securing unit 107 and landing unit 155. The processor 120 may be powered from a power unit 150, such as a battery. The processor 120 may be configured with processor-executable instructions to control the charging of the power unit 150, such as by executing a charging control algorithm using a charge control circuit. Alternatively or additionally, the power unit 150 may be configured to manage charging. The processor 120 may be coupled to a motor system 123 that is configured to manage the motors that drive the rotors 101. The motor system 123 may include one or more propeller drivers. Each of the propeller drivers may include a motor, a motor shaft, and a propeller.

Through control of the individual motors of the rotors 101, the robotic vehicle 100 may be controlled in flight. In the processor 120, a navigation unit 125 may collect data and determine the present position and orientation of the robotic vehicle 100, the appropriate course towards a destination, and/or the best way to perform a particular function.

An avionics component 129 of the navigation unit 125 may be configured to provide flight control-related information, such as altitude, attitude, airspeed, heading and similar information that may be used for navigation purposes. The avionics component 129 may also provide data regarding the orientation and accelerations of the robotic vehicle 100 that may be used in navigation calculations. In some embodiments, the information generated by the navigation unit 125, including the avionics component 129, depends on the capabilities and types of sensor(s) 140 on the robotic vehicle 100.

The control unit 110 may include at least one sensor 140 coupled to the processor 120, which can supply data to the navigation unit 125 and/or the avionics unit 129. For example, sensors 140 may include inertial sensors, such as one or more accelerometers (sensing accelerations), one or more gyroscopes (providing rotation sensing readings), one or more magnetometers or compasses (providing directional orientation information), or any combination thereof. Sensors 140 may also include a barometer that may use ambient pressure readings to provide approximate altitude readings (e.g., absolute elevation level) for the robotic vehicle 100. Inertial sensors may provide navigational information, e.g., via dead reckoning, including at least one of the position, orientation, and velocity (e.g., direction and speed of movement) of the robotic vehicle 100.

The control unit 110 may include at least one camera 127 and an imaging system 129. The imaging system 129 may be implemented as part of the processor 120, or may be implemented as a separate processor, such as an ASIC, a FPGA, or other logical circuitry. For example, the imaging system 129 may be implemented as a set of executable instructions stored in the memory device 121 that execute on a processor 120 coupled to the at least one camera 127. Each of the cameras 127 may include sub-components other than image capturing sensors, including auto-focusing circuitry, ISO adjustment circuitry, and shutter speed adjustment circuitry, etc.

The control unit 110 may include communication resource(s) 130, which may be coupled to at least one antenna 131 and include one or more transceiver. The transceiver(s) may include any of modulators, de-modulators, encoders, decoders, encryption modules, decryption modules, amplifiers, and filters. The communication resource(s) 130 may receive control instructions (e.g., navigational mode toggling, trajectory instructions, general settings, etc.) from one or more wireless communication device 170.

In some embodiments, the sensors 140 may also include a satellite navigation system receiver. The terms "Global Positioning System" (GPS) and "Global Navigation Satellite System" (GNSS) are used interchangeably herein to refer to any of a variety of satellite-aided navigation systems, such as Global Positioning System (GPS) deployed by the United States, GLObal NAvigation Satellite System (GLONASS) used by the Russian military, and Galileo for civilian use in the European Union, as well as terrestrial communication systems that augment satellite-based navigation signals or provide independent navigation information. A GPS receiver may process GNSS signals to provide three-dimensional coordinate information of the robotic vehicle 100 to the navigation unit 125.

Alternatively or in addition, the communication resource(s) 130 may include one or more radio receiver for receiving navigation beacon or other signals from radio nodes, such as navigation beacons (e.g., very high frequency (VHF) omnidirectional range (VOR) beacons), Wi-Fi access points, cellular network sites, radio station, etc. In some embodiments, the navigation unit 125 of the processor 120 may be configured to receive information from a radio resource (e.g., 130).

In some embodiments, the robotic vehicle may use an alternate source of positioning signals (i.e., other than GNSS, GPS, etc.). Because robotic vehicles often fly at low altitudes (e.g., below 400 feet), the robotic vehicle may scan for local radio signals (e.g., Wi-Fi signals, Bluetooth signals, Cellular signals, etc.) associated with transmitters (e.g., beacons, Wi-Fi access points, Bluetooth beacons, small cells (e.g., picocells, femtocells, etc.), etc.) having known locations such as beacons or other signal sources within restricted or unrestricted areas near the flight path. The robotic vehicle 100 may use location information associated with the source of the alternate signals together with additional information (e.g., dead reckoning in combination with last trusted GNSS/GPS location, dead reckoning in combination with a position of the robotic vehicle takeoff zone, etc.) for positioning and navigation in some applications. Thus, the robotic vehicle 100 may navigate using a combination of navigation techniques, including dead-reckoning, camera-based recognition of the land features below the robotic vehicle (e.g., recognizing a road, landmarks, highway signage, etc.), etc. that may be used instead of or in combination with GNSS/GPS location determination and triangulation or trilateration based on known locations of detected wireless access points.

The processor 120 and/or the navigation unit 125 may be configured to communicate with a wireless communication device 170 through a wireless connection (e.g., a cellular data network) via a communication resource (e.g., a radio frequency (RF) resource) 130 to receive assistance data from the server and to provide robotic vehicle position information and/or other information to the server. The communication resource(s) 130 may include a radio configured to receive communication signals, navigation signals, signals from aviation navigation facilities, etc., and provide such signals to the processor 120 and/or the navigation unit 125 to assist in robotic vehicle navigation tasks.

The processor 120 may use a radio (e.g., 130) to conduct wireless communications with one or more wireless communication device 170 such as smartphone, tablet, or other device with which the robotic vehicle 100 may be in communication. A bi-directional wireless communication link 132 may be established between transmit/receive antenna 131 of the communication resource(s) 130 and transmit/receive antenna 171 of the wireless communication device 170. For example, the wireless communication device 170 may be a portable or wearable device of an operator that the robotic vehicle is configured to track. In some embodiments, the wireless communication device 170 and robotic vehicle 100 may communicate through an intermediate communication link such as one or more network nodes or other communication devices. For example, the wireless communication device 170 may be connected to the robotic vehicle 100 through a cellular network base station or cell tower. The wireless communication device 170 may communicate with the robotic vehicle 100 through local access node or through a data connection established in a cellular network.

In some embodiments, the communication resource(s) 130 may be configured to switch between a cellular connection and a Wi-Fi connection depending on the position and altitude of the robotic vehicle 100. For example, while in flight at an altitude designated for robotic vehicle traffic, the communication resource(s) 130 may communicate with a cellular infrastructure to maintain communications with the wireless communication 170. An example of a flight altitude for the robotic vehicle 100 may be at around 400 feet or less, such as may be designated by a government authority (e.g., FAA) for robotic vehicle flight traffic. At this altitude, it may be difficult to establish communication with some of the wireless communication devices 170 using short-range radio communication links (e.g., Wi-Fi). Therefore, communications with the wireless communication device 170 may be established using cellular telephone networks while the robotic vehicle 100 is at flight altitude. Communication with the wireless communication device 170 may transition to a short-range communication link (e.g., Wi-Fi or Bluetooth) when the robotic vehicle 100 moves closer to the wireless communication device 170.

While the various components of the control unit 110 are illustrated in FIG. 1 as separate components, some or all of the components (e.g., the processor 120, the motor control unit 123, the communication resource(s) 130, and other units) may be integrated together in a single device or unit, such as a system-on-chip.

Figure 2:
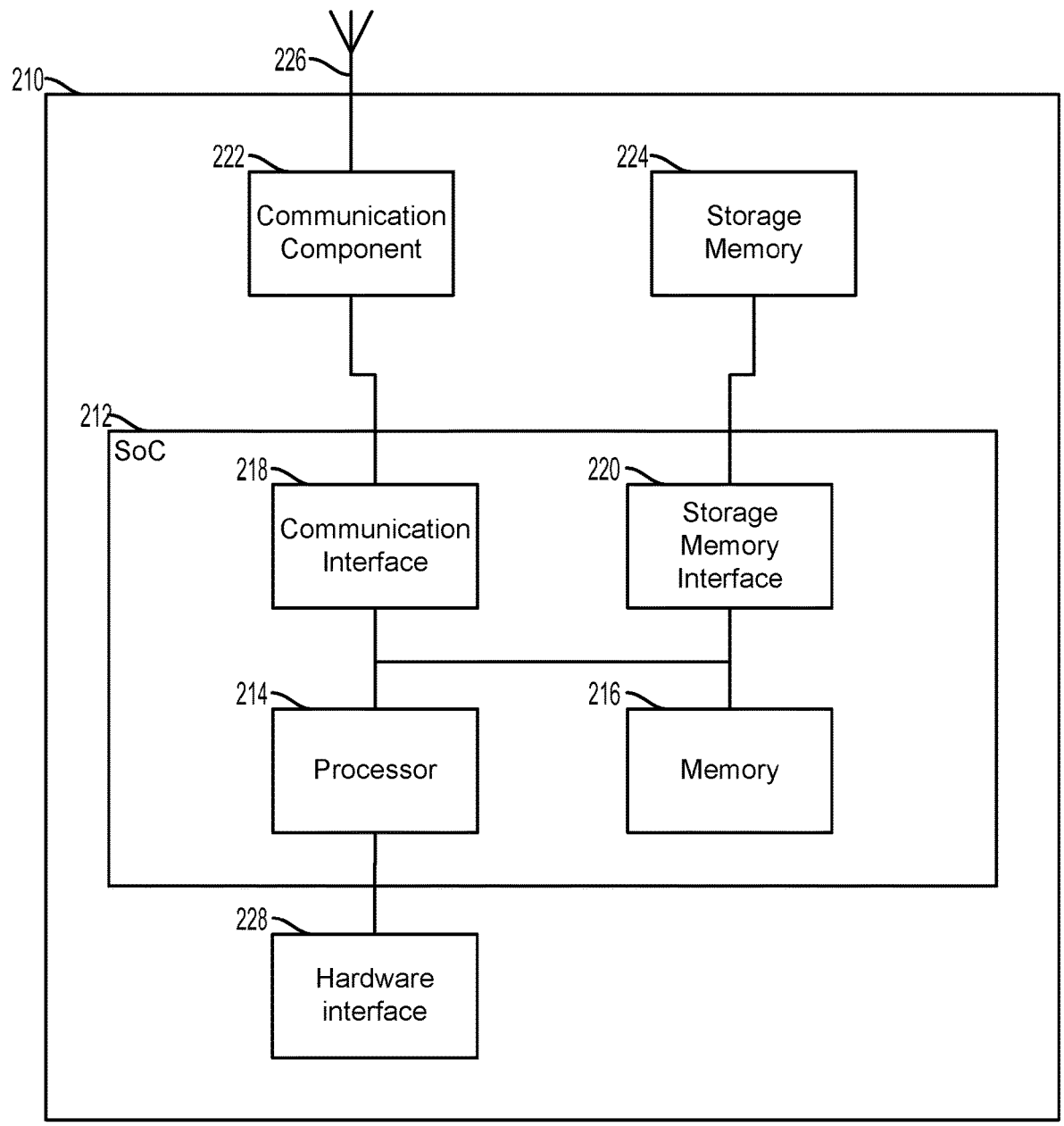
FIG. 2 is a component block diagram illustrating a processing device suitable for implementing various embodiments.

Various embodiments may be implemented within a processing device 210 configured to be used in a robotic vehicle. A processing device may be configured as or including a system-on-chip (SOC) 212, an example of which is illustrated FIG. 2. With reference to FIGS. 1-2, the SOC 212 may include (but is not limited to) a processor 214, a memory 216, a communication interface 218, and a storage memory interface 220. The processing device 210 or the SOC 212 may further include a communication component 222, such as a wired or wireless modem, a storage memory 224, an antenna 226 for establishing a wireless communication link, and/or the like. The processing device 210 or the SOC 212 may further include a hardware interface 228 configured to enable the processor 214 to communicate with and control various components of a robotic vehicle. The processor 214 may include any of a variety of processing devices, for example any number of processor cores.

The term "system-on-chip" (SoC) is used herein to refer to a set of interconnected electronic circuits typically, but not exclusively, including one or more processors (e.g., 214), a memory (e.g., 216), and a communication interface (e.g., 218). The SOC 212 may include a variety of different types of processors 214 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SOC 212 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 212 may include one or more processors 214. The processing device 210 may include more than one SoC 212, thereby increasing the number of processors 214 and processor cores. The processing device 210 may also include processors 214 that are not associated with an SoC 212 (i.e., external to the SoC 212). Individual processors 214 may be multicore processors. The processors 214 may each be configured for specific purposes that may be the same as or different from other processors 214 of the processing device 210 or SOC 212. One or more of the processors 214 and processor cores of the same or different configurations may be grouped together. A group of processors 214 or processor cores may be referred to as a multi-processor cluster.

The memory 216 of the SoC 212 may be a volatile or non-volatile memory configured for storing data and processor-executable instructions for access by the processor 214. The processing device 210 and/or SoC 212 may include one or more memories 216 configured for various purposes. One or more memories 216 may include volatile memories such as random access memory (RAM) or main memory, or cache memory.

Some or all of the components of the processing device 210 and the SOC 212 may be arranged differently and/or combined while still serving the functions of the various embodiments. The processing device 210 and the SOC 212 may not be limited to one of each of the components, and multiple instances of each component may be included in various configurations of the processing device 210.

Figure 3:
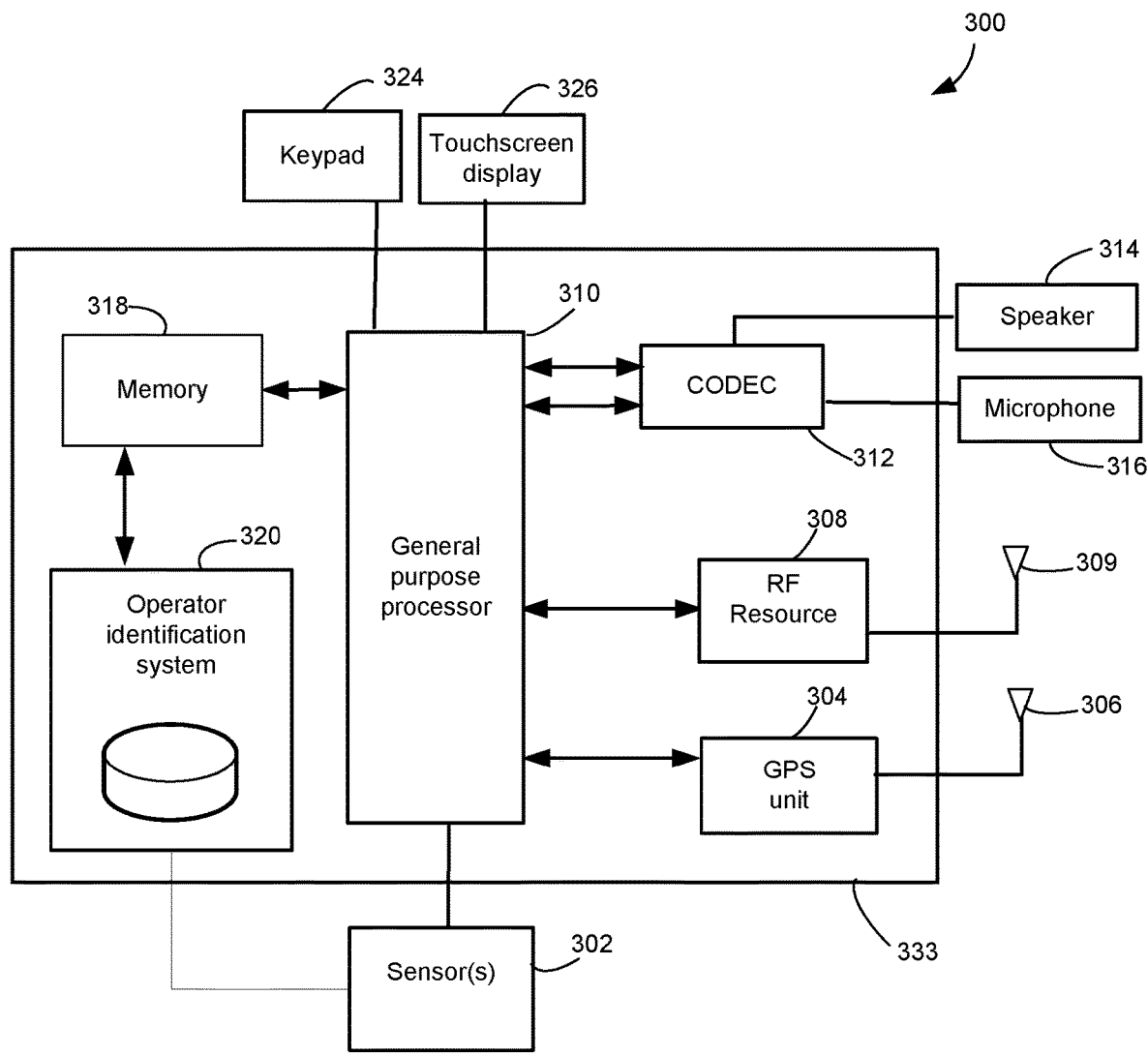
FIG. 3 is a block diagram illustrating a wireless communication device configured to control a robotic vehicle according to various embodiments.

FIG. 3 is a functional block diagram of an example wireless communication device 300 suitable for controlling a robotic vehicle (e.g., 100) in flight in the various embodiments.

With reference to FIGS. 1-3, the wireless communication device 300 may be, for example, a cellular telephone, a personal digital assistant (PDA), a smartphone, a tablet, a stand-alone controller, a wristband, an ankle band, a ring, a watch, a pendant, a belt, or any other type of portable or wearable device.

The wireless communication device 300 may include at least one sensor 302 that may be used to identify the operator of a robotic vehicle (e.g., 100) as a particular operator. For example, the sensor(s) 302 may include one or more of a high definition camera for capturing facial features, an infrared camera for scanning an iris, an optical or ultrasound sensor for matching a fingerprint, etc. In some embodiments, the wireless communication device 300 may identify the operator of the robotic vehicle through user inputs to a keypad 324, a touchscreen display 326, or other input mechanism. Embodiment methods for identifying an operator that are described herein are provided merely as examples, as any method or system may be implemented to identify an initial operator of the robotic vehicle.

The wireless communication device 300 may also include a GPS unit 304 coupled to at least one antenna 306 tuned to the GPS signaling channel. The GPS unit 304 may generate location signals corresponding to a location of the wireless communication device 300 in response to GPS signals received thereby (i.e., when GPS signals are available).

The wireless communication device 300 may include an RF resource 308 that is coupled to at least one antenna 309 and configured to communicate control commands and other information to robotic vehicles as described. In various embodiments, the RF resource 308 and GPS unit 304 may be coupled to a general-purpose processor 310. The RF resource 308 may include receive circuitry for demodulating and decoding RF signals to recover operational parameter signals that are provided to the general-purpose processor 310. The RF resource 308 may include transmit circuitry for generating RF signals in response to operational control signals for transmission across the wireless link to the robotic vehicle. In various embodiments, the RF resource 308 may implement separate transmit and receive functionalities, or may include a transceiver that combines transmitter and receiver functions.

In various embodiments, the RF resource 308 may wirelessly communicate with a robotic vehicle via one or more wireless communication protocols, such as Wi-Fi Bluetooth, or other long-range or short-range RF communication.

In various embodiments, the wireless communication device 300 may include a general-purpose processor 310, which may be a processing unit, application specific integrated circuit (ASIC), a field programmable gate array (FPGA), or other electronic circuitry for performing computations. The general-purpose processor 310 may be coupled to a coder/decoder (CODEC) 312. The CODEC 312 may in turn be coupled to a speaker 314 and a microphone 316. The general-purpose processor may also be coupled to a memory 318 such as non-transitory computer readable storage medium.

The memory 318 may store executable instructions to configure the general-purpose processor 310 to implement operator identification protocols. For example, the general-purpose processor 310 may process a sensor reading of the sensor(s) 302 and perform one or more sensor fusion algorithm to identify operator habit information (e.g., operation preferences and operator skill level).

In various embodiments, the wireless communication device 300 may include an operator identification system 320. The operator identification system 320 may be coupled to the general-purpose processor 310 and to one or more sensor(s) 302. In various embodiments, the operator identification system 320 may include biometric processing circuitry and a local storage for operator biometric data (e.g., facial photographs, fingerprint patterns, etc.) for identifying an existing operator and associated profile.

In some embodiments, the operator profile may include inputs to authenticate the operator's identity, such as log-in credentials (e.g., passwords, pin codes, etc.), which may be received via the keypad 324, the touchscreen display 326, or other input mechanism. In some embodiments, biometric processing circuitry may be configured to recognize an operator by comparing one or more physiological characteristics (e.g., fingerprint, facial, palm print, iris/retinal, etc.) or behavioral characteristics (e.g., voice, typing rhythm, etc.) to stored reference characteristics. In some embodiments, local storage may be a separate storage device, examples of which may include universal serial bus (USB) drives, memory cards, solid-state drives (SSDs), hard disk drives (HDDs), floppy disks, optical disks, magnetic tapes, and the like. For example, the local storage may be a removable storage device such as a memory card, for example, a PC Card, CompactFlash, SmartMedia, Memory Stick, Memory Stick Duo, Memory Stick PRO Duo, Miniature Card, Multimedia Card (MMC), Reduced Size Multimedia Card (RS-MMC), MMCmicro Card (MMCmicro), PS2 card, Secure Digital (SD) card, S×S, Universal Flash Storage (UFS), miniSD, microSD, xD-Picture Card, Intelligent Stick (iStick), etc.

In some embodiments, the local storage may be a partition or part of the memory device 318. The biometric processing circuitry may be implemented by the general-purpose processor 310, or may be implemented in a separate processing unit.

The operator identification system 320 may perform various tasks, including receiving operator input through the sensor(s) 302 and using stored information to determine whether the information matches a particular operator. In some embodiments, the operator identification system may be configured to access a centralized storage of operator profile information to obtain identification data (e.g., biometric data). In some embodiments, the operator identification system may include a number of operator profiles with biometric or other identifiers that may be stored in local memory. For example, the operator identification system may perform an analysis that includes feature extraction at any suitable level of complexity, image segmentation, data verification, image recognition, matching, etc.

In some embodiments, the general purpose processor 310, memory 318, RF resource 308, GPS unit 304, and operator identification system 320 may be included in a system-onchip device (SoC) 333. The sensor(s) 302, and the antennas 306, 309, as well as various input and output devices may be coupled to components of the system-on-chip device 333, such as interfaces or controllers. Example operator input components suitable for use in the wireless communication device 300 may include, but are not limited to, the keypad 324 and the touchscreen display 326. In some embodiments, the touchscreen display 326 may be used to implement an operator interface to control and monitor the robotic vehicle. In some embodiments, the touchscreen display 326 may implement a graphical operator interface (GUI) that presents visual information to an operator of the wireless communication device 300. The visual information displayed by the GUI may include a graphical map view depicting a location of the robotic vehicle, information about the robotic vehicle's estimated position in relation to its environment, and a display of signals received from the robotic vehicle, a visual feed view generated from visual signals received from the robotic vehicle, etc.

In various embodiments, the authentication information for a robotic vehicle operator may be inputted to the wireless communication device 300 associated with the robotic vehicle. The wireless communication device may be a control device, such as a smartphone, tablet, or other control device.

In various embodiments, information about how an operator has used the robotic vehicle may be attached to or stored within the operator profile as metadata. In some embodiments, the operator profile and associated metadata may be stored locally on the robotic vehicle or on a control device. In some embodiments, the operator profile and associated metadata may be stored in a central database accessible to multiple devices through the internet, such as storage maintained by a cloud computing service.

In various embodiments, information stored as metadata associated with an operator profile may include various data reflecting operator habits and operator input characteristics that are observed over time. In some embodiments, the information may include operation preferences and operator skill level, as well as preference-based and performance-based settings derived therefrom. In various embodiments, storing information as metadata may include creating a new metadata structure, adding new fields to an existing metadata structure, or replacing or updating values in fields within an existing metadata structure.

In various embodiments, operation preferences may be derived from flight sensor data, received operator input selections, or a combination thereof. An example of the operation preferences may include applications or activities for which the robotic vehicle is employed by the operator.

In some embodiments, the particular application or activity for which the robotic vehicle is currently used may be ascertained by analyzing flight sensor data collected by the robotic vehicle during operation. Such flight sensor data may include (but is not limited to) location data (e.g., from global positioning system (GPS) sensors, mobile device transmitters enabling location triangulation, etc.), computer vision data (e.g., from imaging devices capable of detecting visible, infrared, or ultraviolet light, such as cameras, etc.), proximity data (e.g., from ultrasonic sensors, lidar, time-of-flight cameras, etc.), inertial data (e.g., from accelerometers, gyroscopes, inertial measurement units (IMUs), etc.), altitude data, pressure data (e.g., from barometers), audio data (e.g., from microphones), or field data (e.g., from magnetometers, electromagnetic sensors, etc.). Multiple on-board sensors may be used to provide flight sensor data.

In some embodiments, the particular application or activity for which the robotic vehicle is currently used may be chosen by the operator and identified based on received operator input to a controlling wireless communication device (e.g., smartphone, tablet, etc.).

Regardless of how identified, usage statistics for a robotic vehicle may be calculated over time, and the application(s) or one or more activities for which the operator typically employs the robotic vehicle may be stored as part of operation preferences in metadata associated with the operator profile.

In addition to operation preferences, the information reflecting operator habits may include an operator skill level. In various embodiments, the operator skill level may be identified by analyzing flight sensor data and control command data (i.e., the operator-generated commands to pilot or drive the robotic vehicle). For example, the altitude, airspeed, relative smoothness of acceleration or deceleration, accuracy of navigation, etc., or a combination thereof, may be analyzed to ascertain operator skill levels. In some embodiments, changes in one or more parameter representing operator skill level may be additionally monitored during operation for sudden changes (i.e., deviations from current values) that are larger than a threshold amount. Such sudden changes may be interpreted by the robotic vehicle as indicating a switch to a new operator (which presumably has a different skill level than the previous operator).

In various embodiments, the identified operation preferences and operator skill level associated with a particular operator may be used to derive preference-based and performance-based settings, respectively. The derived settings may be stored locally on the robotic vehicle (or elsewhere), and used to modify vehicle functionality and control configurations during operation. Further, the derived settings may be stored as or used to modify metadata associated with the operator profile, either in addition to or instead of the operation preferences and/or operator skill level.

Examples of preference-based settings (i.e., settings derived at least in part based on operation preferences) may include (but are not limited to), for example, a preferred flight mode, an operator assist strategy, a set of additional features, etc.

In some embodiments, the robotic vehicle may automatically determine a preferred flight mode (e.g., a standard mode, simple mode, first-person view mode, etc.) based on the application or activity for which the operator typically employs the robotic vehicle.

As used herein, the term "flight mode" refers to a control scheme for a robotic vehicle that provides a specific set of operating rules. For example, a "free flight mode" or "manual flight mode" may include operating rules that permit the operator to control the robotic vehicle with little or no automated intervention or autocorrection. In a flight mode, the operator may directly control the position, orientation, velocity, and/or acceleration of the robotic vehicle with respect to up to six degrees of freedom of movement. As another example, a "fully autonomous" flight mode may include operating rules that control the robotic vehicle independent of operator input. As another example, an "autonomous return" flight mode may control the robotic vehicle to return to a specified location (e.g., the initial takeoff location) without any control inputs from the operator. In another example, a "waypoint" flight mode may be semi-autonomous by enabling manual operator input identifying a sequence of target locations or "waypoints" for the robotic vehicle to traverse. In the waypoint fight mode, the robotic vehicle may autonomously determine a flight path between the waypoints and then navigate according the flight path.

For example, if an operator generally uses the robotic vehicle for remote control (RC) racing, a first-person view (FPV) mode may be preferred to allow that operator to control the vehicle as if he or she were in the device by viewing images provided by one or more onboard front-facing camera. As another example, if an operator generally uses the robotic vehicle for commercial delivery of a payload, an automatic return mode may be preferred to ensure the robotic vehicle efficiently returns to the originating site, regardless of controller range.

Similarly, the robotic vehicle may automatically determine an operator assist strategy based on the typical application or activity of the operator. For example, if the operator generally employs the robotic vehicle for capturing aerial images or video, an operator assist strategy that provides a high level of autonomous flight capability may be derived. However, if the operator generally employs the robotic vehicle for remote control (RC) racing, an operator assist strategy that relies mainly on manual control may be derived.

Further, the robotic vehicle may automatically determine a set of enabled features based on the typical application or activity of the operator. That is, in some embodiments, the robotic vehicle controller may include modules that add various layers of advanced features, such as visual inertial odometry, collision avoidance, etc. However, such modules may consume significant processing power. To avoid unnecessary battery drain, the robotic vehicle in various embodiments may disable features or throttle processes other than those that are necessary for the operator's typical application or activity. For example, if an operator typically employs the robotic device to capture aerial images or video, the set of enabled features may include a high-resolution camera and image processing system, whereas such features may be disabled if the operator typically employs the robotic vehicle for RC racing. In some embodiments, the preferred flight mode and set of enabled vehicle features may be additionally constrained by the hardware and software capabilities of the robotic vehicle.

In some embodiments, preference-based settings, such as the flight mode, may be derived in part or overridden by selections received by operator inputs. As another example, the vehicle features enabled may be automatically configured to only include those features required for typical application or activity of the operator, but additional functions may be manually enabled by the operator.

In various embodiments, performance-based settings may be derived based at least in part on operator skill level associated with the operator. In some embodiments, performance-based settings may additionally or alternatively be derived at least in part from flight sensor data, as well as other information.

Examples of performance-based settings may include characteristics that are scaled according to an operator's skill level, such as relative levels of accuracy versus autocorrection for tracking input control commands, a maximum allowed velocity and/or acceleration, etc. For example, if the operator skill level identified for a particular operator indicates that he or she is a beginner, the derived performance-based characteristics may provide for low accuracy and extensive autocorrection to input control commands to smooth out the resulting motion.

However, if the operator skill level identified for a particular operator indicates that he or she is an advanced operator, the derived performance-based characteristics may require accurately adhering to input control commands, with little or no autocorrection.

Further, the performance-based settings may provide for a relatively low maximum allowed velocity and/or acceleration. In various embodiments, such characteristics may be based in part on certain flight sensor data that provides situational or environmental context to the flight (e.g., GPS receiver, barometric pressure sensor, etc.).

Flight sensor data in various embodiments may be collected from multiple different on-board sensors, such as those for altitude, acceleration (pitch, roll, and yaw), attitude geographic position, speed, outside air temperature, and/or barometric pressure of the robotic vehicle.

In some embodiments, each sensor may each have a predetermined sampling rate, which may be uniform and/or different from the sampling rates of other sensors positioned on the robotic vehicle. The sampling rates for selected from all the sensors may change under selected conditions, such as a rapid descent or change in acceleration. The number and type of sensors that may be monitored can vary between vehicles. In some embodiments, the collected flight sensor data may be transmitted as electrical signals from the sensor to a data processing and analysis unit that can save the raw sensor data in memory. In some embodiments, the data processing and analysis units may filter the raw sensor data before analysis. The raw data and/or filtered data can be saved in a data recorded prior to, concurrently with, or subsequent to the analysis. In some embodiments, the sensors may filter the sensor data internally prior to transmission for data analysis. In some embodiments, the sensors may internally buffer sensor data for later transmission.

In various embodiments, once a robotic vehicle is activated, it may be configured to identify the current operator and access his or her operator profile. If the operator cannot be identified, the robotic vehicle may automatically create a new operator profile for the operator. In some embodiments, before the robotic vehicle begins a mission or flight task, the new operator profile may include only minimal information, such as a randomly generated identification code and a reference to the robotic vehicle location. In some embodiments, the robotic vehicle may be configured to prompt an operator to input initial identification information and other details about the operator. After the operator begins operation of the robotic vehicle, information and data may be collected to generate metadata associated with the operator profile for future use, in the same manner that an existing operator profile may be modified.

If the current operator is identified, the robotic vehicle may access that operator's profile including associated metadata, and automatically implement configurations for that operator. Specifically, in some embodiments the associated metadata may include information reflecting operator habits, such as operation preferences and operator skill level. Upon accessing such information, preference-based settings and performance-based settings may be derived on the robotic vehicle, and applied by the controller to customize the vehicle for the operator.

In some embodiments, the derived preference-based settings and performance-based settings may be stored as metadata with the operator profile, in addition or as an alternative to the operator habit information. Upon accessing the operator profile and associated metadata, the robotic vehicle may immediately implement the performance-based and preference-based settings.

Once configured for the operator, the robotic vehicle may collect and analyze in-flight input, such as flight sensor data, control commands, and any received operator selections. The robotic vehicle may use the in-flight operator inputs to continue identifying operator habit information, including operation preferences and operator skill level.

In some embodiments, modifying metadata associated with the operator profile may involve updating the operator habit information as well as preference-based and performance-based settings. In various embodiments, the operator habit information may be regularly updated during operation of the robotic vehicle (or after operation of the robotic vehicle by the operator is complete), based on the collected operator input data. For example, an operator skill level that is stored in metadata associated with an operator profile may be updated if the data analysis during flight resulted in an operator skill that deviates from the current skill level by an amount that is more than a first threshold (i.e., large enough increased or decrease).

The robotic vehicle may be configured to monitor and/or re-identify the current operator throughout operation of the robotic vehicle, enabling the dynamic recognition of a new operator mid-flight (e.g., the operator hands over smartphone to another person). For example, the robotic vehicle may periodically repeat an operator identification step (e.g., fingerprint identification, facial recognition, etc.) to confirm the identity of the current operator. If a different operator is identified, the robotic vehicle may automatically access the new operator's profile, to the extent one exists. In this manner, the robotic vehicle may automatically apply the preference-based settings and performance-based settings that are stored in, or calculated using, metadata associated with the new operator's profile.

Alternatively, the robotic vehicle may be configured to detect a new operator based on whether input data is consistent with the current operator profile. That is, the robotic vehicle may handle sudden changes in control commands, flight sensor data, or the combination thereof which are outside of expected thresholds as an indication that a different operator is controlling flight. For example, a new operator may be detected if the data analysis during flight indicates an operator skill that deviates from the current skill level by an amount that is more than a second threshold (i.e., large enough increase or decrease) that is greater than the first threshold. If deviations exceeding the second threshold are detected, the robotic vehicle may identify the new operator, for example, through the same identification technique originally implemented (e.g., fingerprint identification, facial recognition, etc.) Ramifications of detecting a different operator may include (but are not limited to) identifying the new operator if possible (e.g., requesting login or other identifiers as discussed), switching/reconfiguring profiles (if able to identify the new operator), reverting back to defaults (if unable to identify the new operator), and/or not updating the first operator's profile with the actions performed by the new identified operator.

In some embodiments, the robotic vehicle may use dynamically identified operator habit information to monitor the identity of the operator during operation, and detect any switch from the first operator to a different operator. In various embodiments, the operator skill level, or a parameter thereof (e.g., acceleration, rate of change in altitude, pitch, yaw, or roll, etc.) may be monitored or computed throughout the flight, and compared to a current value. The robotic vehicle may detect that a switch to a new operator if the operator skill level or parameter value differs from the current value by more than a threshold amount.

In particular, a deviation threshold indicating that a switch in operator has occurred (i.e., the second threshold) may be established, which may be consistent with a greater change in operator behaviors or skill level than the first threshold for operator skill level as described. That is, the operator skill level for the operator may be updated if the data analyzed during flight indicates a change in operator skill that deviates from the current skill level by more than the first threshold, but less than the second threshold. If the deviation in observed operator skill level deviates from the current skill level by more than the second threshold, the robotic vehicle may detect that a different operator has taken control of the robotic vehicle.

In various embodiments, data analysis tasks include analyzing raw flight sensor data, as well as the analysis and update of data required to identify operator habit information and to derive of preference-based and/or performance-based settings, may be accomplished using any conventional manner for statistical analysis. Data analysis may involve processes for inspecting, cleaning, transforming, and/or modeling data.

In some embodiments, the analysis results may be stored in memory and, if necessary, recalled subsequently for event analysis such as accident reconstruction.

In some embodiments, the operator profile database may be centrally stored to allow the transfer of operator-specific configurations between different robotic vehicles. That is, an operator may have access to a fleet of similar robotic vehicles, such as for a commercial delivery service. Various embodiments may enable use of locally identified operator habit information and derived settings, as well as in-flight updates, to modify metadata associated with the operator profile in a centrally stored database.

In this manner, the robotic vehicle may continue to learn specific behaviors and characteristics associated with an operator, and enable automatically configuring different robotic vehicles in a consistent manner during operation by that operator.

Various embodiments may enable an extensive level of customization for operation of one robotic vehicle by different operators, or for a single operator across multiple robotic vehicles. In this manner, various embodiments may improve efficiency in battery use of a robotic vehicle, and may allow improved operator experience.

Figure 4A:
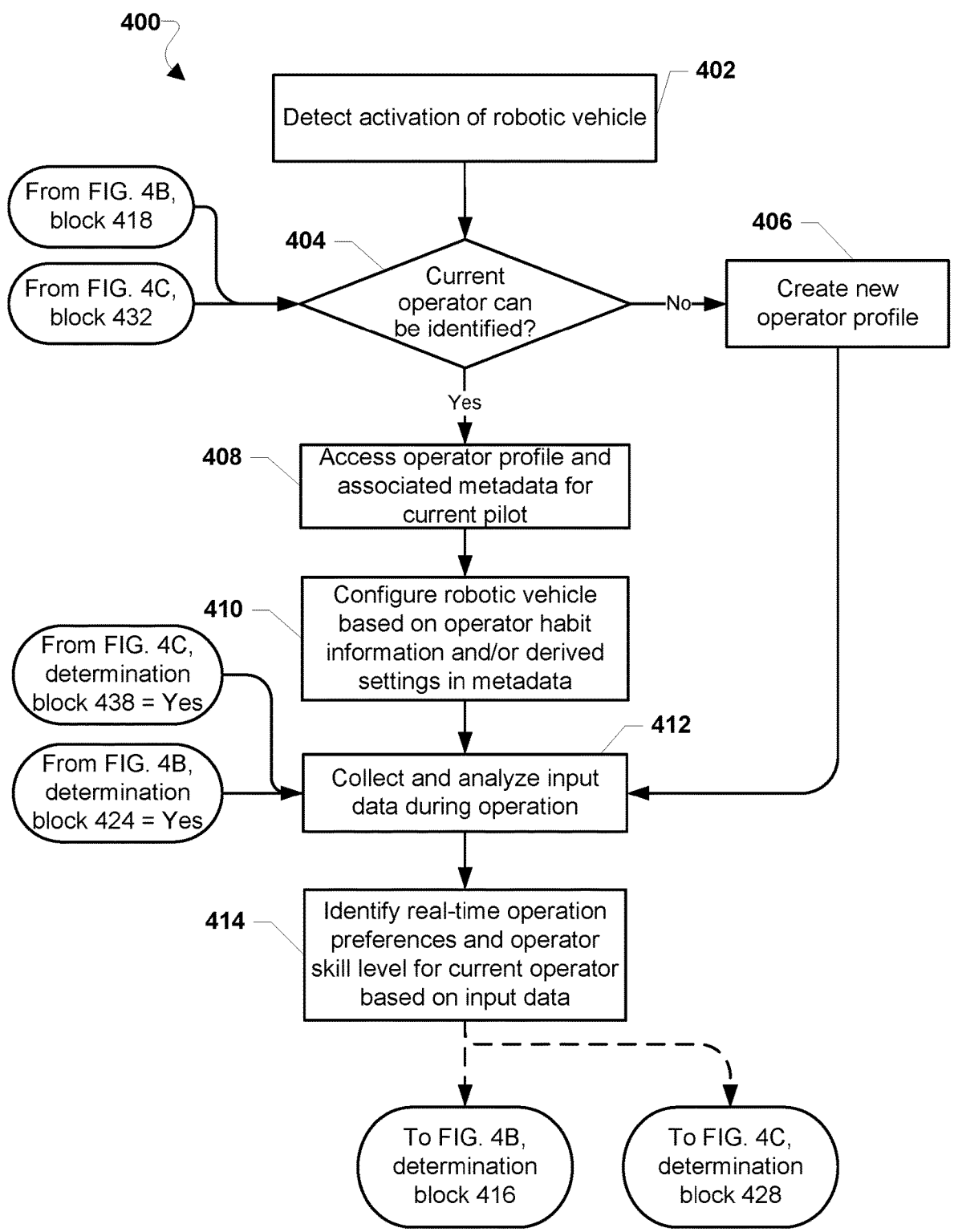
FIGS. 4A-4C are process flow diagrams illustrating a method for dynamically configuring operations of a robotic vehicle based the current operator according to various embodiments.
Figure 4B:
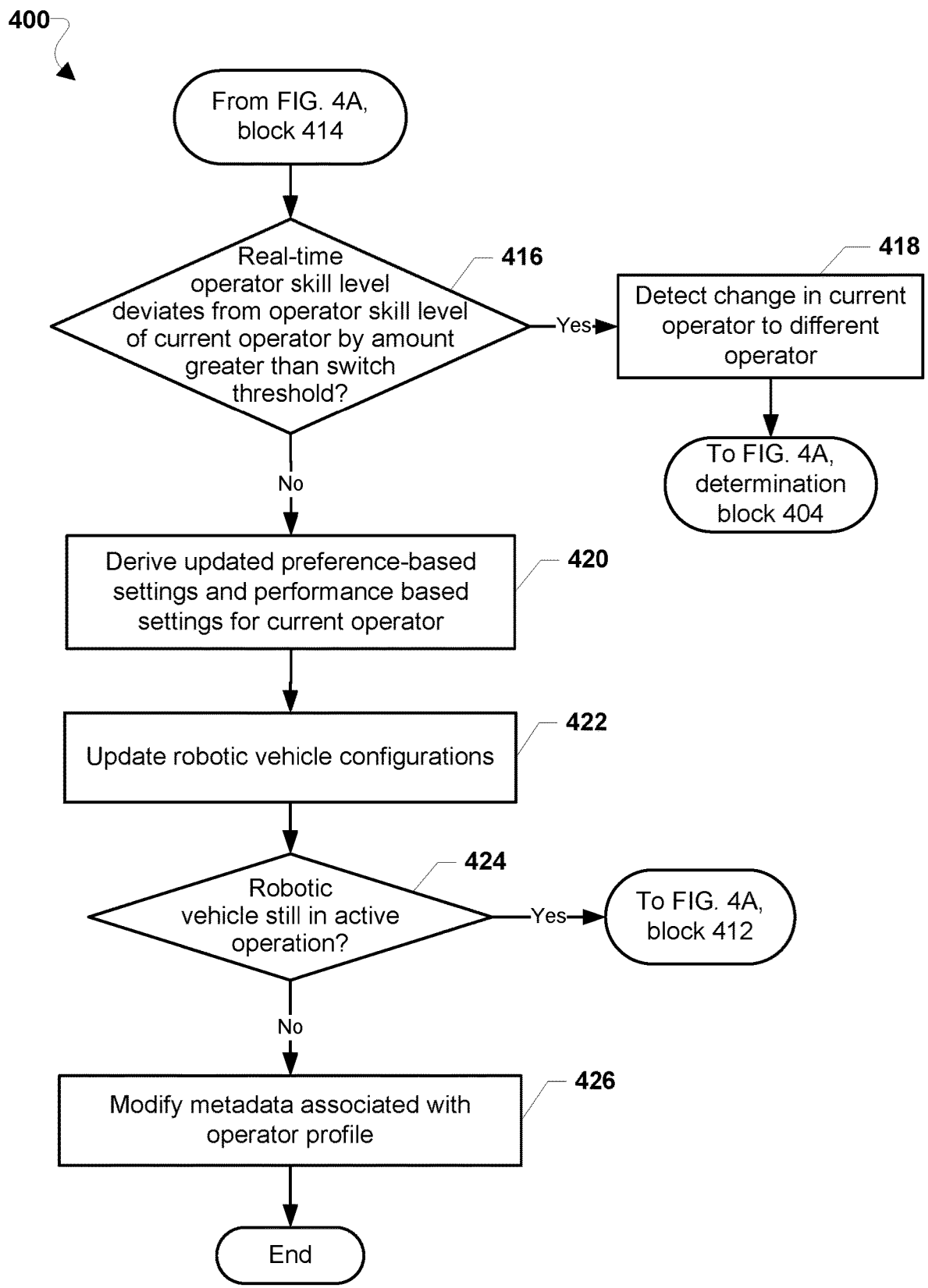
Figure 4C:
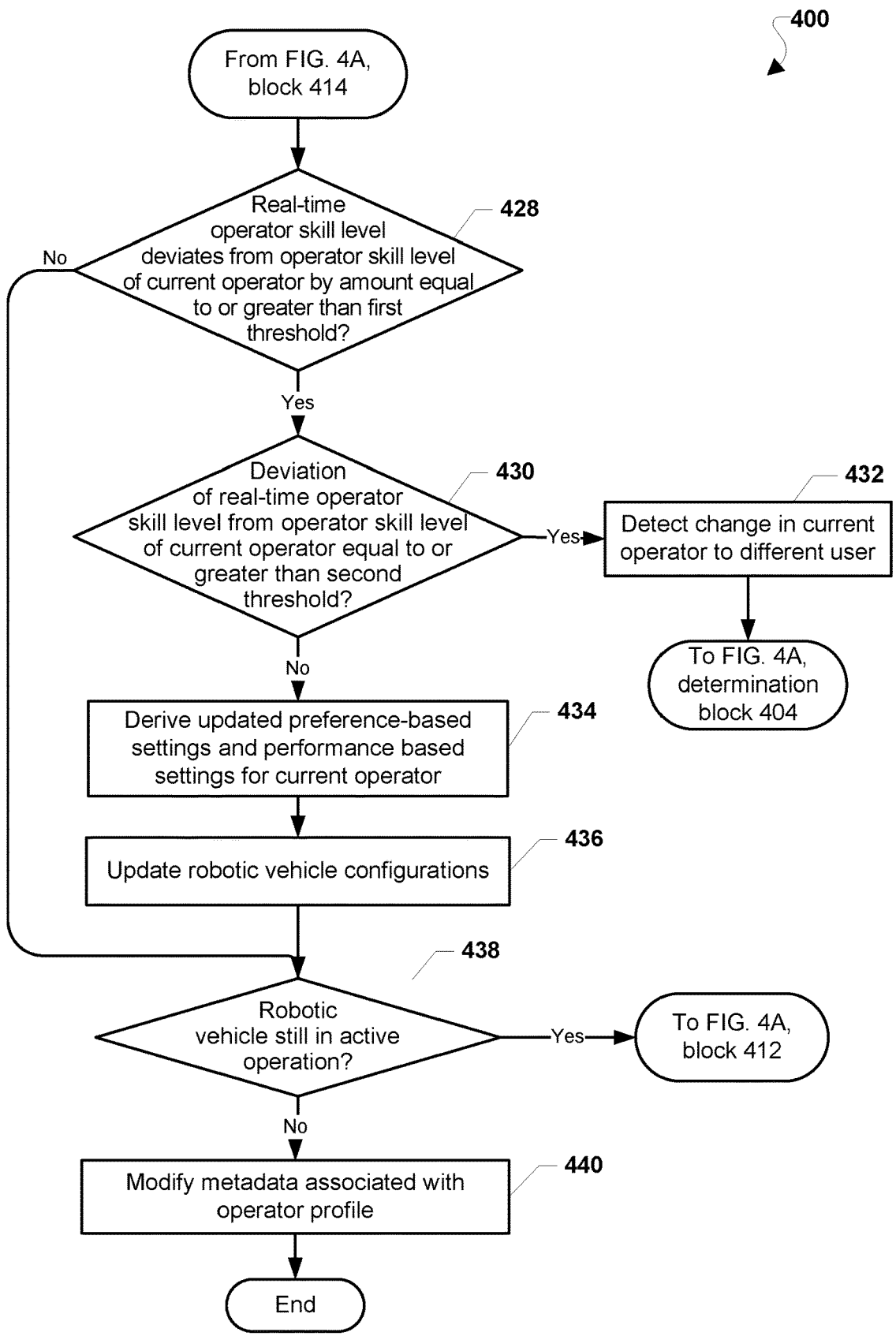

FIGS. 4A-4C illustrate a method 400 for customizing operating configurations for a robotic vehicle based on information about the operator according to various embodiments. Referring to FIGS. 1-4C, the operations of the method 400 may be implemented by one or more processors associated with a robotic vehicle, such as the robotic vehicle 100, the processing device 210, or the SoC 212. The one or more processors associated with the robotic vehicle may include, for example, the processor(s) 120, 214, or a separate controller implemented by a wireless communication device, such as the wireless communication device 300.

In block 402, a processor associated with the robotic vehicle may detect activation of the robotic vehicle. In various embodiments, the processor may detect activation once the robotic vehicle or associated control device is powered on, for example. In some embodiments, the processor may detect activation once the robotic vehicle receives an assignment or flight mission from a control device, or receives input from an operator that indicates preparation to operate the robotic vehicle.

In determination block 404, the processor may determine whether a current operator (also referred to as a "first operator") of the robotic vehicle can be identified. Such determination may be based, for example, on information received by prompting the current operator to input login information to a control device (e.g., 300), such as through the keypad (e.g., 324), the microphone (e.g., 316), or other interfaces. In some embodiments, the identification may be based on biometric information of the current operator obtained through the operator identification system 320, which may be sent to the robotic vehicle. The comparison of the current operator's input data or biometric information to existing operator profiles may be performed on the robotic vehicle, or performed on the control device in communication with the robotic vehicle. In some embodiments, the comparison may involve accessing or polling a separate server that stores operator profiles in one or more database. Therefore, the processor may be configured to establish a communication link (e.g., to an internet server or other service) to perform the comparison.

In response to determining that the current operator cannot be identified (i.e., determination block 404="No"), the processor may create a new operator profile for the current operator in block 406. The new operator profile may be created at the time of the determination (i.e., in flight), or may be created after the robotic device is no longer in actively operating.

In response to determining that the current operator can be identified (i.e., determination block 404="Yes"), the processor may access the operator profile and associated metadata for the operator in block 408. As described, the operator profile and associated metadata may be stored locally on the robotic vehicle, in a central database shared by multiple robotic vehicles, or both. Therefore, accessing the particular operator profile may be performed by retrieving information over a communication link, or by querying a storage device in the robotic vehicle.

In block 410, the processor may configure the robotic vehicle based on the operator habit information and derived settings obtained from the associated metadata. That is, the processor may ascertain, from the metadata associated with the operator profile, operation preferences and operator skill level, as well as preference-based settings and performance-based settings derived therefrom. The processor may automatically apply the information and settings, thereby customizing the robotic vehicle for the current operator. As described, examples of preference-based settings may include a preferred flight mode, piloting assist strategy, set of enabled features, etc., while examples of the performance-based settings may include characteristics that are provide scaling according to the operator skill level.

In block 412, the processor may collect and analyze input data during operation of the robotic vehicle. In particular, while the robotic vehicle is in flight the processor may receive flight sensor data from on-board sensors, as well as information about control commands from the operator and any operator input selections received on the control device.

In block 414, the processor may identify real-time operation preferences and operator skill level for the current operator based on the input data. In particular, while in flight the received sensor data, operator input selections, or combination thereof may be used to provide real-time operation preferences (e.g., the application or activity for which the robotic vehicle is used). In some embodiments, identifying the real-time operation preferences may involve updating existing operation preferences that were ascertained from the operator profile metadata. Further, the control commands, flight sensor data, or a combination thereof received in flight may be used to identify a real-time operator skill level.

In some embodiments, the processor may determine whether the real-time operator skill level deviates from the operator skill level of the current operator by more than the switch threshold in determination block 416. Specifically, as described the processor may compare the real-time operator skill level value to that of the associated metadata for the current operator to compute the difference between the values.

In response to determining that the real-time operator skill level deviates from the operator skill level of the current operator by more than the switch threshold (i.e., determination block 418="Yes"), the processor may detect that the current operator has been changed to a different operator in block 418. The processor may again determine whether the current operator can be identified in determination block 404.

In response to determining that the real-time operator skill level does not deviate from the operator skill level of the current operator by more than the switch threshold (i.e., determination block 416="No"), the processor may derive updated preference-based settings and performance-based settings for the current operator in block 420. Specifically, the processor may apply the identified real-time operator habit information (i.e., real-time operation preferences and operator skill level) to the existing operator habit information stored in metadata for the current operator. The resulting updated operator habit information may be used to derive updated preference-based settings and performance-based settings by the processor.

In block 422, the processor may update the robotic vehicle configuration. Specifically, the processor may apply the updated preference-based and performance-based settings to the robotic vehicle, thereby dynamically configuring operation according to learned information.

In determination block 424, the processor may determine whether the robotic vehicle is still in active operation (i.e., still in flight). In response to determining that the robotic vehicle is still in active operation (i.e., determination block 424="Yes"), the processor may return to continue to collect and analyze input data in block 412.

In response to determining that the robotic vehicle is no longer in active operation (i.e., determination block 424="Yes"), the processor may update the metadata associated with the operator profile for the operator in block 426. For example, the processor may cause the existing metadata to be updated to reflect the updated operator habit information and updated preference-based and performance-based settings.

In some embodiments, the processor may determine whether the real-time operator skill level deviates from the operator skill level of the current operator by the same as or more than a first threshold in determination block 428. As described, the processor may compare the real-time operator skill level value to that of the associated metadata for the current operator to compute or otherwise determined the difference between the values, and compare the difference to the first threshold.

In response to determining that the real-time operator skill level deviates from the operator skill level of the current operator by the same as or more than the first threshold (i.e., determination block 428="Yes"), the processor may determine whether the deviation of the real-time operator skill level from the operator skill level of the current operator is also equal to or greater than a second threshold in determination block 430. As described, the second threshold may be larger than the first threshold.

In response to determining that the deviation of the real-time operator skill level from the operator skill level of the current operator is equal to or greater than the second threshold (i.e., determination block 430="Yes"), the processor may determine that the current operator has been changed to a different operator in block 432. The processor may again determine whether the current operator can be identified in determination block 404 and proceed as described.

In response to determining that the deviation of the real-time operator skill level from the operator skill level of the current operator is less than the second threshold (i.e., determination block 430="No"), the processor may derive updated preference-based settings and performance-based settings for the current operator in block 434. Specifically, the processor may use the identified real-time operator habit information (i.e., real-time operation preferences and operator skill level) to update or refine the existing operator habit information stored in metadata for the current operator. The resulting updated operator habit information may be used to derive updated preference-based settings and performance-based settings by the processor.

In block 436, the processor may update the robotic vehicle configuration. Specifically, the processor may apply the updated preference-based and performance-based settings to the robotic vehicle, thereby dynamically configuring operation according to learned information regarding the current operator.

In response to determining that the real-time operator skill level deviates from the operator skill level of the current operator by less than the first threshold (i.e., determination block 428="No"), the processor may determine whether the robotic vehicle is still in active operation (i.e., still in flight) in determination block 438. In response to determining that the robotic vehicle is still in active operation (i.e., determination block 438="Yes"), the processor may continue to collect and analyze input data in block 412.

In response to determining that the robotic vehicle is no longer in active operation (i.e., determination block 438="Yes"), the processor may modify the metadata associated with the operator profile for the operator in block 440. For example, the processor may cause the existing metadata to be updated to reflect the updated operator habit information and updated preference-based and performance-based settings.

Figure 5A:
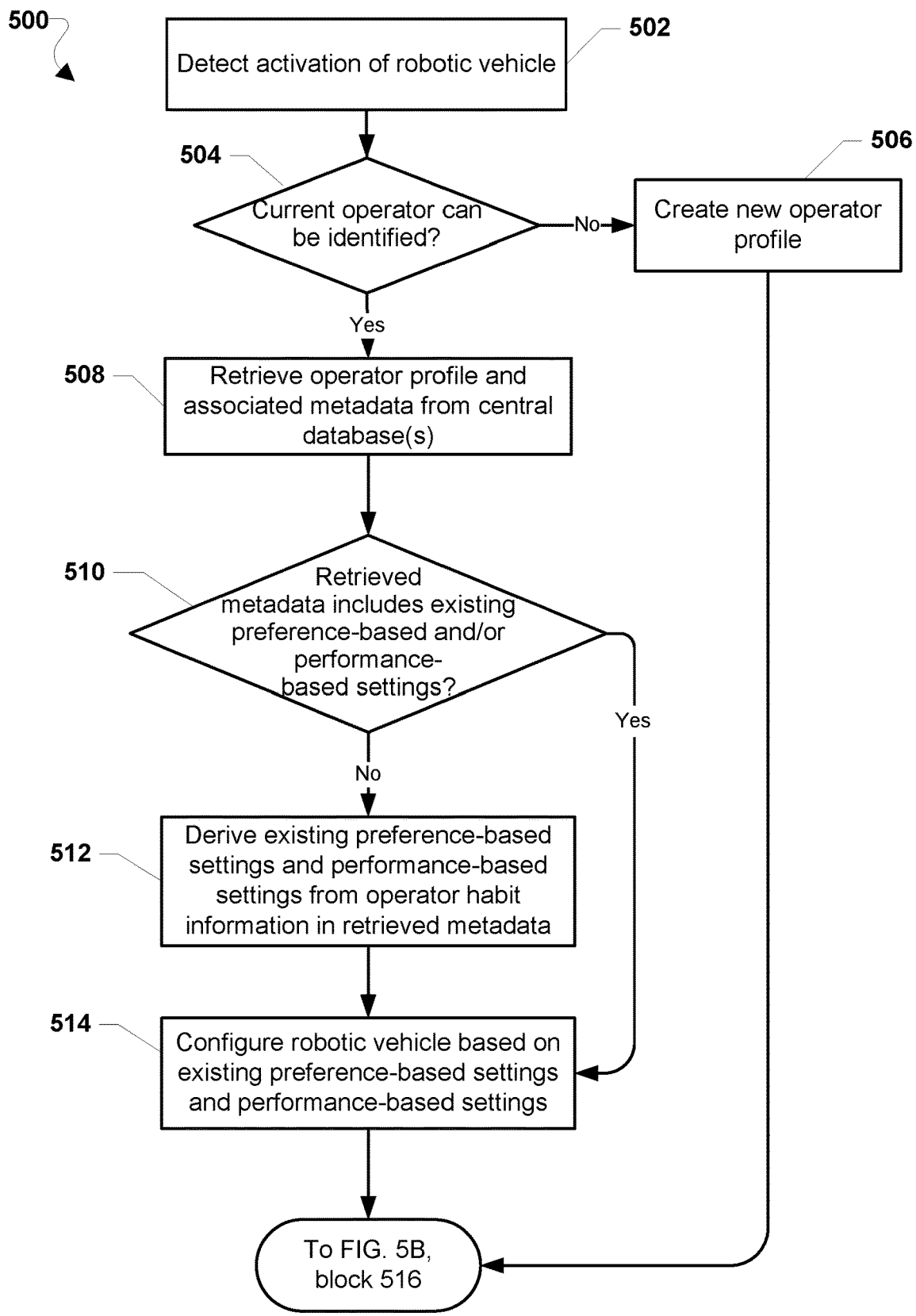
FIGS. 5A-5B are process flow diagrams illustrating a method for accessing and updating operator profile information associated with an operator during operation of a robotic vehicle according to various embodiments.
Figure 5B:
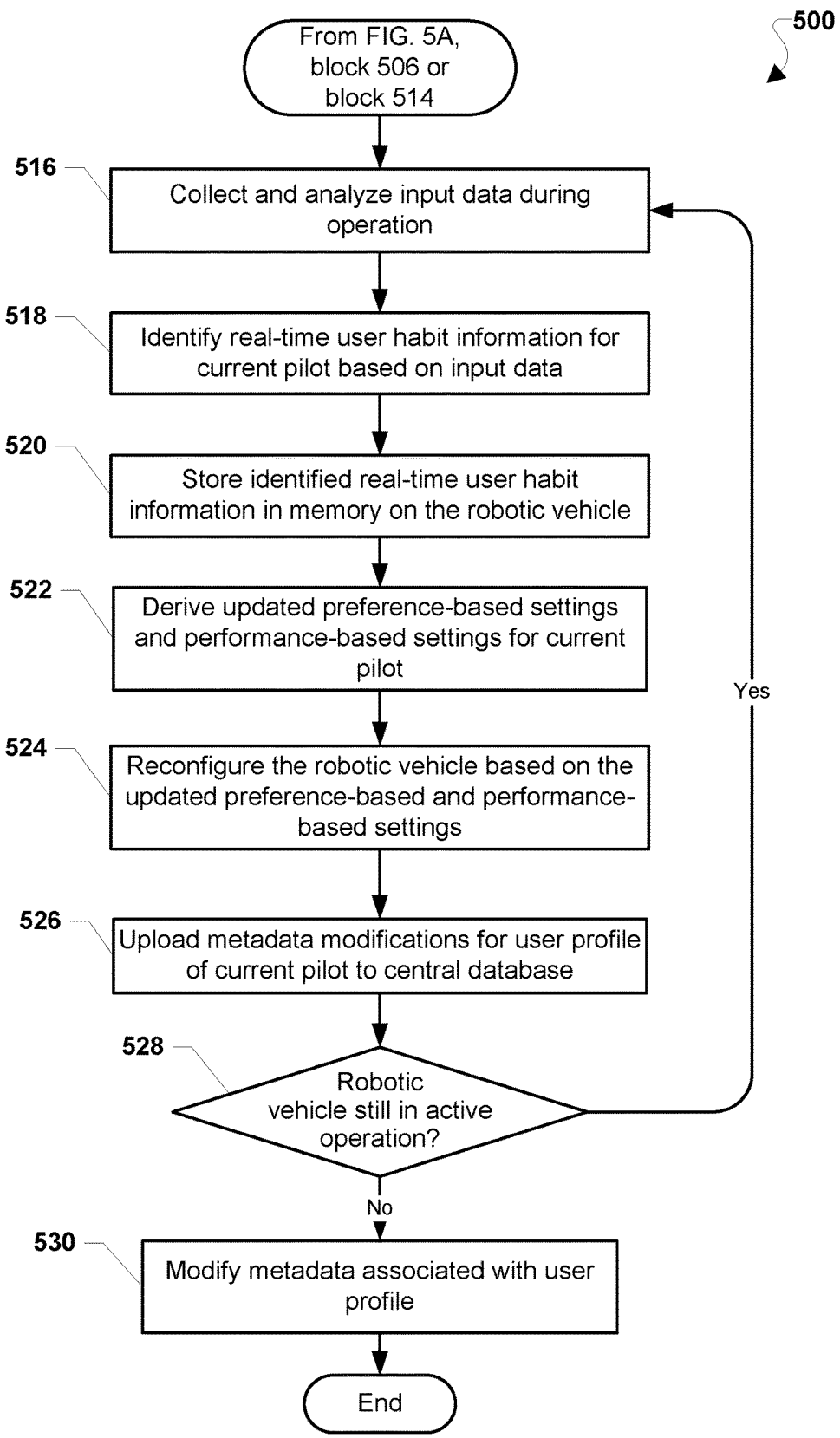

FIGS. 5A-5B illustrates a method 500 for customizing operating configurations to enable transfer between multiple robotic vehicles accessible to an operator, according to various embodiments. Referring to FIGS. 1-5B, the operations of the method 500 may be implemented by one or more processor associated with a robotic vehicle, such as the robotic vehicle 100, the processing device 210, or the SoC 212. The one or more processor associated with the robotic vehicle may include, for example, the processor(s) 120, 214, or a separate controller implemented by a wireless communication device, such as the wireless communication device 300.

In block 502, a processor associated with the robotic vehicle may detect activation of the robotic vehicle. In various embodiments, the activation may be detected once the robotic vehicle or associated control device is powered on. In some embodiments, activation may be detected once the robotic vehicle receives an assignment or flight mission from a control device, or receives input from an operator that indicates preparation to operate the robotic vehicle.

In determination block 504, the processor may determine whether a current operator of the robotic vehicle can be identified. Such determination may be based, for example, on information received by prompting the current operator to input login information to a control device (e.g., 300), such as through the keypad (e.g., 324), the microphone (e.g., 316), or other interfaces. In some embodiments, the identification may be based on biometric information of the current operator obtained through the operator identification system 320, which may be sent to the robotic vehicle. In various embodiments, operator profiles may be stored in one or more central database accessible to multiple robotic vehicles. Therefore, the processor may access or poll at least one server containing the one or more central database to perform the comparison of obtained biometric other identification information. To access the information in the central database(s), the processor may establish a communication link between the robotic vehicle and the server(s) over the Internet or other wireless communication network.

In response to determining that the current operator cannot be identified (i.e., determination block 504="No"), the processor may create a new operator profile for the current operator in block 506.

In response to determining that the current operator can be identified (i.e., determination block 504="Yes"), the processor may retrieve the corresponding operator profile and associated metadata from the central database(s) in block 508. In some embodiments, retrieving the operator profile and associated metadata may involve downloading data over the established communication link, and temporarily storing the data in local memory on the robotic vehicle.

In determination block 510, the processor may determine whether the retrieved metadata includes existing preference-based and/or performance-based settings. In some embodiments, such settings that are derived from other data (e.g., information identifying operator habits) may be generated and regenerated in an ad hoc manner during each use of a robotic vehicle by the operator. In this manner, the central database(s) may avoid compiling and storing data that may be efficiently reconstructed from other metadata associated with the operator profile.

In response to determining that the retrieved metadata does not include preference-based and/or performance based settings (i.e., determination block 510="No"), the processor may derive existing preference-based and/or performance based settings from operator habit information in the retrieved metadata in block 512. As described, such operator habit information may include operation preferences (e.g., typical application or activity of the operator) and operator skill level.

In response to determining that the retrieved metadata does include preference-based and/or performance based settings (i.e., determination block 510="Yes"), the processor may configure the robotic vehicle based on the preference-based and/or performance-based settings in block 514. That is, in some embodiments, such settings derived from the operator habit information may also be stored as part of metadata associated with the operator profile. As such, the preference-based and performance-based settings used to configure the robotic vehicle may have either been generated locally, or may have been part of the metadata retrieved from the central database(s).

In block 516, the processor may collect and analyze input data during operation of the robotic vehicle. In particular, while the robotic vehicle is in transit (e.g., flight) the processor may receive sensor data (e.g., flight sensor data) from on-board sensors, as well as information about control commands from the operator and any operator input selections received on the control device.

In block 518, the processor may identify real-time operator habit information for the current operator based on the input data. As described, such operator habit information may include operation preferences and operator skill level.

In block 520, the processor may store the identified real-time operator habit information locally on the robotic vehicle.

The processor may derive updated preference-based settings and performance-based settings for the current operator in block 522. Specifically, the processor may apply the identified real-time operator habit information to the existing operator habit information from the metadata for the current operator. The resulting updated operator habit information may be used by the processor to derive updated preference-based settings and performance-based settings.

In block 524, the processor may reconfigure the robotic vehicle based on the updated preference-based and performance-based settings. In various embodiments, such a reconfiguration may be performed by using the updated preference-based and performance-based settings to adjust the robotic vehicle accordingly, thereby dynamically configuring operations according to learned information.

In block 526, the processor may upload modifications to the metadata associated with the operator's operator profile to the central database(s). In embodiments in which the metadata does not include preference-based or performance-based settings, the processor may upload the updated operator habit information to the server(s) storing the central database(s). In embodiments in which the metadata does include preference-based and/or performance-based settings, the processor may upload the updated operator habit information and the updated preference-based and performance-based settings derived therefrom to the server(s). In this manner, metadata associated with the operator's operator profile may be replaced, altered, or added, to reflect the most recent in-flight modifications, which may be applied if the operator subsequently uses a different robotic vehicle.

In determination block 528, the processor may determine whether the robotic vehicle is still in active operation (i.e., still in flight). In response to determining that the robotic vehicle is still in active operation (i.e., determination block 528="Yes"), the processor may return to continue to collect and analyze input data in block 516.

In response to determining that the robotic vehicle is not still in active operation (i.e., determination block 528="Yes"), the processor may modify the metadata associated with the operator profile for the operator in block 530. For example, the processor may cause the existing metadata to be updated to reflect the updated operator habit information and updated preference-based and performance-based settings.

Figure 6:
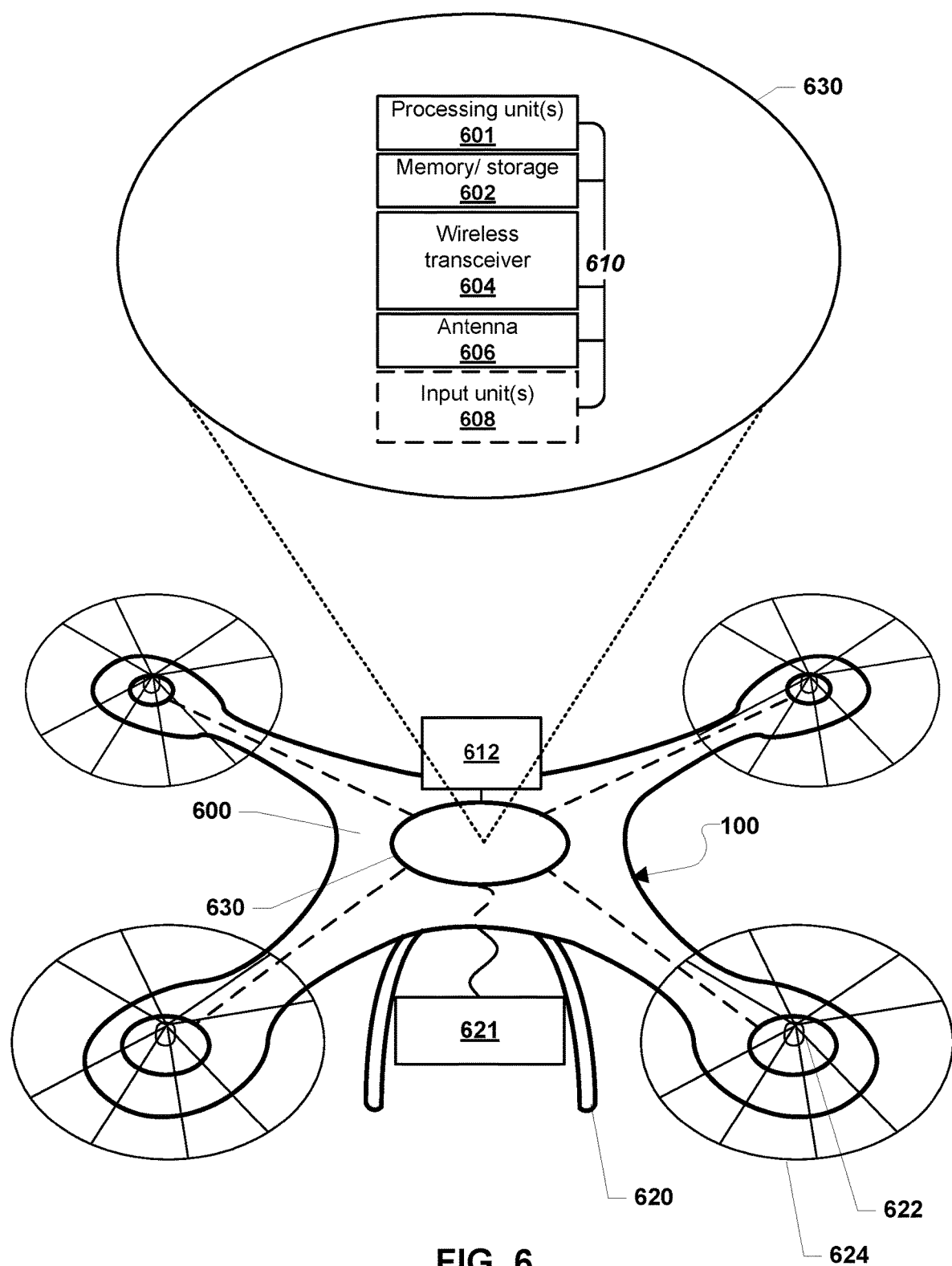
FIG. 6 is a component block diagram of a robotic vehicle suitable for use with the various embodiments.

The various embodiments may be implemented within a variety of robotic vehicles, an example of which in the form of a four-rotor robotic vehicle is illustrated in FIG. 6 that is suitable for use with the various embodiments including the embodiments described with reference to FIGS. 4A-5B. With reference to FIGS. 1-6, the robotic vehicle 100 may include a body 600 (i.e., fuselage, frame, etc.) that may be made out of any combination of plastic, metal, or other materials suitable for flight. The body 600 may include a processor 630 that is configured to monitor and control the various functionalities, subsystems, and/or other components of the robotic vehicle 100. For example, the processor 630 may be configured to monitor and control various functionalities of the robotic vehicle 100, such as any combination of modules, software, instructions, circuitry, hardware, etc. related to propulsion, navigation, power management, sensor management, and/or stability management.

The processor 630 may include one or more processing unit(s) 601, such as one or more processors configured to execute processor-executable instructions (e.g., applications, routines, scripts, instruction sets, etc.), a memory and/or storage unit 602 configured to store data (e.g., flight plans, obtained sensor data, received messages, applications, etc.), and a wireless transceiver 604 and antenna 606 for transmitting and receiving wireless signals (e.g., a Wi-Fi® radio and antenna, Bluetooth®, RF, etc.). In some embodiments, the robotic vehicle 100 may also include components for communicating via various wide area networks, such as cellular network transceivers or chips and associated antenna (not shown). In some embodiments, the processor 630 of the robotic vehicle 100 may further include various input units 608 for receiving data from human operators and/or for collecting data indicating various conditions relevant to the robotic vehicle 100. For example, the input units 608 may include camera(s), microphone(s), location information functionalities (e.g., a global positioning system (GPS) receiver for receiving GPS coordinates), flight instruments (e.g., attitude indicator(s), gyroscope(s), accelerometer(s), altimeter(s), compass(es), etc.), keypad(s), etc. The various components of the processor 630 may be connected via a bus 610 or other similar circuitry.

The body 600 may include landing gear 620 of various designs and purposes, such as legs, skis, wheels, pontoons, etc. The body 600 may also include a payload mechanism 621 configured to hold, hook, grasp, envelope, and otherwise carry various payloads, such as boxes. In some embodiments, the payload mechanism 621 may include and/or be coupled to actuators, tracks, rails, ballasts, motors, and other components for adjusting the position and/or orientation of the payloads being carried by the robotic vehicle 100. For example, the payload mechanism 621 may include a box moveably attached to a rail such that payloads within the box may be moved back and forth along the rail. The payload mechanism 621 may be coupled to the processor 630 and thus may be configured to receive configuration or adjustment instructions. For example, the payload mechanism 621 may be configured to engage a motor to re-position a payload based on instructions received from the processor 630.

The robotic vehicle 100 may be of a helicopter design that utilizes one or more rotors 624 driven by corresponding motors 622 to provide lift-off (or take-off) as well as other aerial movements (e.g., forward progression, ascension, descending, lateral movements, tilting, rotating, etc.). The robotic vehicle 100 may utilize various motors 622 and corresponding rotors 624 for lifting off and providing aerial propulsion. For example, the robotic vehicle 100 may be a "quad-copter" that is equipped with four motors 622 and corresponding rotors 624. The motors 622 may be coupled to the processor 630 and thus may be configured to receive operating instructions or signals from the processor 630. For example, the motors 622 may be configured to increase rotation speed of their corresponding rotors 624, etc. based on instructions received from the processor 630. In some embodiments, the motors 622 may be independently controlled by the processor 630 such that some rotors 624 may be engaged at different speeds, using different amounts of power, and/or providing different levels of output for moving the robotic vehicle 100. For example, motors 622 on one side of the body 600 may be configured to cause their corresponding rotors 624 to spin at greater revolutions per minute (RPM) than rotors 624 on the opposite side of the body 600 to balance the robotic vehicle 100 burdened with an off-centered payload.

The body 600 may include a power source 612 that may be coupled to and configured to power the various other components of the robotic vehicle 100. For example, the power source 612 may be a rechargeable battery for providing power to operate the motors 622, the payload mechanism 621, and/or the units of the processor 630.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

Figure 7:
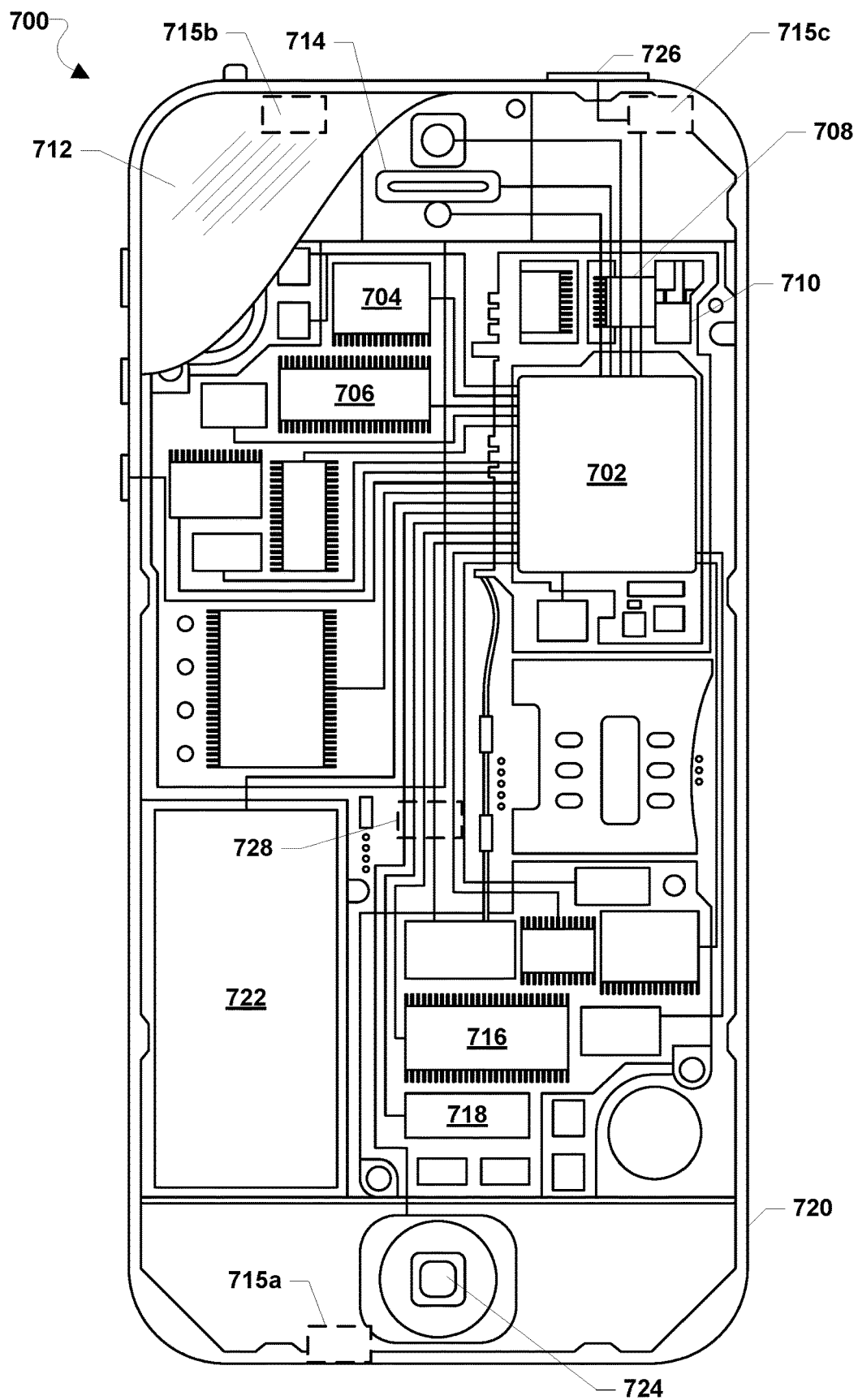
FIG. 7 is a component diagram of an example wireless communication device suitable for use with various embodiments.

In various embodiments, the wireless communication device 300 that may control the robotic vehicle 100 through cellular networks, or other communication links, may be any of a variety of wireless communication devices (e.g., smartphones, tablets, etc.) an example in the form of a smartphone or wireless communication device 700 is illustrated in FIG. 7. With reference to FIGS. 1-7, the wireless communication device 700 may include a processor 702 coupled to the various systems of the wireless communication device 700. For example, the processor 702 may be coupled to a touch screen controller 704, radio communication elements, speakers and microphones, and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. In another embodiment (not shown), the wireless communication device 700 may also be coupled to an external memory, such as an external hard drive.

The touch screen controller 704 and the processor 702 may also be coupled to a touch screen panel 712, such as a resistive-sensing touch screen, capacitive-sensing touch screen, infrared sensing touch screen, etc. Additionally, the display of the wireless communication device 700 need not have touch screen capability. The wireless communication device 700 may have one or more radio signal transceivers 708 (e.g., Peanut, Bluetooth, Bluetooth LE, ZigBee, Wi-Fi, RF radio, etc.) and antennae 710, for sending and receiving communications, coupled to each other and/or to the processor 702. The transceivers 708 and antennae 710 may be used with the above-mentioned circuitry to implement the various wireless transmission protocol stacks and interfaces. The wireless communication device 700 may include a cellular network wireless modem chip 716 that enables communication via a cellular network and is coupled to the processor.

The wireless communication device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

In some embodiments, the wireless communication device 700 may include microphones 715a-715c. For example, the wireless communication device may have a conventional microphone 715a for receiving voice or other audio frequency energy from an operator during a call. The wireless communication device 700 may further be configured with additional microphones 715b and 715c, which may be configured to receive audio including ultrasound signals. Alternatively, all microphones 715a, 715b, and 715c may be configured to receive ultrasound signals. The microphones 715a-715c may be piezo-electric transducers, or other conventional microphone elements. Because more than one microphone 715a-715c may be used, relative location information may be received in connection with a received ultrasound signal through various triangulation methods. At least two microphones 715a-715c configured to receive ultrasound signals may be used to generate position information for an emitter of ultrasound energy.

The wireless communication device 700 may also include speakers 714 for providing audio outputs. The wireless communication device 700 may also include a housing 720, constructed of a plastic, metal, or a combination of materials, for containing all or some of the components discussed herein. The wireless communication device 700 may include a power source 722 coupled to the processor 702, such as a disposable or rechargeable battery. The rechargeable battery may also be coupled to the peripheral device connection port to receive a charging current from a source external to the wireless communication device 700. The wireless communication device 700 may also include a physical button 724 for receiving operator inputs. The wireless communication device 700 may also include a power button 726 for turning the wireless communication device 700 on and off.

In some embodiments, the wireless communication device 700 may further include an accelerometer 728 that senses accelerations and vibrations of the device. In various embodiments, the accelerometer 728 may be used to determine the x, y, and z accelerations of the wireless communication device 700. Using the information from the accelerometer 728 in combination gyroscopes and a digital compass, the processor 702 may determine the pointing direction of the wireless communication device 700.

The processors 630, 702 may be any programmable microprocessor, microcomputer or multiple processor chip or chips that can be configured by software instructions (applications) to perform a variety of functions, including the functions of various embodiments described above. In some mobile devices, multiple processors may be provided, such as one processor dedicated to wireless communication functions and one processor dedicated to running other applications. Typically, software applications may be stored in the internal memory 602, 706 before they are accessed and loaded into the processors 630, 702. The processors 630, 702 may include internal memory sufficient to store the application software instructions. In many mobile devices, the internal memory may be a volatile or nonvolatile memory, such as flash memory, or a mixture of both. For the purposes of this description, a general reference to memory refers to memory accessible by the processors 630, 702 including internal memory or removable memory plugged into the mobile device and memory within the processor processors 630, 702 themselves.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable software, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method performed by a processor of a robotic vehicle for customizing operation of the robotic vehicle, the method comprising:
   identifying a current operator of the robotic vehicle;
   configuring the robotic vehicle based on metadata associated with an operator profile for the current operator, wherein the metadata includes operator habit information comprising an operator skill level;
   determining, during an operation of the robotic vehicle configured for the current operator, whether the current operator has changed to a new operator, wherein the new operator is different from the current operator; and
   in response to determining that the current operator of the robotic vehicle has changed:
      identifying, during an operation of the robotic vehicle by the new operator, the new operator as the current operator of the robotic vehicle;
      deriving preference-based settings and performance-based settings for the new operator; and
      updating configurations of the robotic vehicle for the new operator.

2. The method of claim 1, wherein determining, during the operation of the robotic vehicle, whether the current operator has changed to the new operator comprises determining whether an operator input deviates from the operator habit information for the current operator by more than a threshold amount.

3. The method of claim 1, wherein determining, during the operation of the robotic vehicle, whether the current operator has changed to the new operator comprises determining whether a real-time operator skill level deviates from the operator skill level of the current operator by more than a threshold amount.

4. The method of claim 1, further comprising:
   determining whether a real-time operator skill level deviates from the operator skill level of the current operator by an amount that is equal to or greater than a first threshold and less than a second threshold; and updating the operator skill level of the current operator in response to determining that the real-time operator skill level deviates from the operator skill level of the current operator by an amount that is equal to or greater than the first threshold and less than the second threshold.

5. The method of claim 4, wherein determining, during the operation of the robotic vehicle, whether the current operator has changed to the new operator comprises determining whether the real-time operator skill level deviates from the operator skill level of the current operator by an amount that is equal to or greater than the second threshold.

6. The method of claim 1, wherein identifying the current operator of the robotic vehicle comprises:
receiving, from a control device associated with the robotic vehicle, identification information input by the current operator;
determining whether the received identification information matches an identifier within an existing operator profile; and
accessing the existing operator profile in response to determining that the received identification information matches an identifier within the existing operator profile.

7. The method of claim 6, wherein the received identification information comprises biometric data for the current operator, a log-in credential, or a combination thereof.

8. The method of claim 6, further comprising creating a new operator profile in response to determining that the received identification information does not match an identifier within an existing operator profile.

9. The method of claim 1, further comprising:
collecting and analyzing input data during operation of the robotic vehicle, wherein the input data includes control commands and sensor data;
updating the operator habit information based at least in part on the input data;
deriving updated preference-based settings and updated performance-based settings based at least in part on the updated operator habit information; and
modifying the metadata associated with the operator profile based on the updated operator habit information, the updated preference-based settings and the updated performance-based settings.

10. The method of claim 1, wherein the operator habit information further comprises operation preferences, and wherein the operation preferences include at least one application or activity for which an operator employs the robotic vehicle.

11. The method of claim 1, wherein the metadata associated with the operator profile for the current operator includes the preference-based and performance-based settings, wherein the preference-based and performance-based settings are derived at least in part based on the operator habit information.

12. The method of claim 11, wherein:
the preference-based settings comprise one or more of a preferred flight mode, an operator assist strategy, and a set of enabled features on the robotic vehicle; and
the performance-based settings comprise one or more scalable parameters configured to adjust an operation style based on the operator skill level.

13. The method of claim 1, further comprising monitoring one or more parameters representing the operator habit information during operation of the robotic vehicle configured for the current operator;
wherein determining whether the current operator has changed to a new operator comprises determining a deviation of the values of the one or more parameters from the operator skill level during the operation of the robotic vehicle configured for the current operator.

14. The method of claim 1, wherein the robotic vehicle is remotely operated by both the current operator and the new operator, via a computing device.

15. A robotic vehicle, comprising:
a processor configured with processor-executable instructions to:
identify a current operator of the robotic vehicle;
configure the robotic vehicle based on metadata associated with an operator profile for the current operator, wherein the metadata includes operator habit information comprising an operator skill level;
determine, during an operation of the robotic vehicle configured for the current operator, whether the current operator has changed to a new operator, wherein the new operator is different from the current operator; and
in response to a determination that the current operator of the robotic vehicle has changed:
identify, during an operation of the robotic vehicle by the new operator, the new operator as the current operator of the robotic vehicle;
derive preference-based settings and performance-based settings for the new operator; and
update configurations of the robotic vehicle for the new operator.

16. The robotic vehicle of claim 15, wherein the processor is further configured with processor-executable instructions to determine, during the operation of the robotic vehicle, whether the current operator has changed to the new operator by determining whether an operator input deviates from the operator habit information for the current operator by more than a threshold amount.

17. The robotic vehicle of claim 15, wherein the processor is further configured with processor-executable instructions to determine, during the operation of the robotic vehicle, whether the current operator has changed to the new operator by determining whether a real-time operator skill level deviates from the operator skill level of the current operator by more than a threshold amount.

18. The robotic vehicle of claim 15, wherein the processor is further configured with processor-executable instructions to:
determine whether a real-time operator skill level deviates from the operator skill level of the current operator by an amount that is equal to or greater than a first threshold and less than a second threshold; and
update the operator skill level of the current operator in response to determining that the real-time operator skill level deviates from the operator skill level of the current operator by an amount that is equal to or greater than the first threshold and less than the second threshold.

19. The robotic vehicle of claim 18, wherein the processor is further configured with processor-executable instructions to determine, during the operation of the robotic vehicle, whether the current operator has changed to the new operator by determining whether the real-time operator skill level deviates from the operator skill level of the current operator by an amount that is equal to or greater than the second threshold.

20. The robotic vehicle of claim 15, wherein the processor is further configured with processor-executable instructions to identify the current operator of the robotic vehicle by:
  receiving, from a control device associated with the robotic vehicle, identification information input by the current operator;
  determining whether the received identification information matches an identifier within an existing operator profile; and
  accessing the existing operator profile in response to determining that the received identification information matches an identifier within the existing operator profile.

21. The robotic vehicle of claim 15, wherein the processor is further configured with processor-executable instructions to:
  collect and analyze input data during operation of the robotic vehicle, wherein the input data includes control commands and sensor data;
  update the operator habit information based at least in part on the input data;
  derive updated preference-based settings and updated performance-based settings based at least in part on the updated operator habit information; and
  modify the metadata associated with the operator profile based on the updated operator habit information, the updated preference-based settings and the updated performance-based settings.

22. The robotic vehicle of claim 15, wherein the operator habit information further comprises operation preferences, and wherein the operation preferences include at least one application or activity for which an operator employs the robotic vehicle.

23. The robotic vehicle of claim 15, wherein the metadata associated with the operator profile for the current operator includes the preference-based and performance-based settings, wherein preference-based and performance-based settings are derived at least in part based on the operator habit information.

24. The robotic vehicle of claim 23, wherein:
  the preference-based settings comprise one or more of a preferred flight mode, an operator assist strategy, and a set of enabled features on the robotic vehicle; and
  the performance-based settings comprise one or more scalable parameters configured to adjust an operation style based on the operator skill level.

* * * * *